(12) United States Patent
Soffer

(10) Patent No.: US 11,715,476 B2
(45) Date of Patent: Aug. 1, 2023

(54) SECURE AUDIO SWITCH COMPRISING AN ANALOG LOW PASS FILTER COUPLED TO AN ANALOG AUDIO DIODE

(71) Applicant: HIGH SEC LABS LTD., Caesarea (IL)

(72) Inventor: Aviv Soffer, Caesarea (IL)

(73) Assignee: HIGH SEC LABS LTD., Caesarea (IL)

( * ) Notice: Subject to any disclaimer, the term of this patent is extended or adjusted under 35 U.S.C. 154(b) by 194 days.

(21) Appl. No.: 17/044,751

(22) PCT Filed: Apr. 1, 2019

(86) PCT No.: PCT/IL2019/050377
§ 371 (c)(1),
(2) Date: Oct. 1, 2020

(87) PCT Pub. No.: WO2019/193590
PCT Pub. Date: Oct. 10, 2019

(65) Prior Publication Data
US 2021/0090579 A1    Mar. 25, 2021

Related U.S. Application Data

(60) Provisional application No. 62/651,277, filed on Apr. 2, 2018.

(51) Int. Cl.
*G10L 19/00* (2013.01)
*H04N 7/52* (2011.01)
(Continued)

(52) U.S. Cl.
CPC ............... *G10L 19/00* (2013.01); *H04N 7/52* (2013.01)

(58) Field of Classification Search
CPC ......... G06F 3/023; G10L 19/002; A63J 17/00
(Continued)

(56) References Cited

U.S. PATENT DOCUMENTS 4,376,404 A * 3/1983 Haddad ............... A63J 17/00
239/18
8,769,172 B2   7/2014 Soffer et al.
(Continued)

FOREIGN PATENT DOCUMENTS

EP     0070 949 B1 *  7/1981
EP     2 031 902 A2 *  8/2007
(Continued)

OTHER PUBLICATIONS

Search Report of PCT International Application No. PCT/IL2019/050377 dated Apr. 1, 2019.
(Continued)

*Primary Examiner* — Farzad Kazeminezhad
(74) *Attorney, Agent, or Firm* — Browdy and Neimark, PLLC

(57) ABSTRACT

A secure audio switch comprising: a plurality of host computer interfaces, each for interfacing the secure audio switch with a corresponding host computer, for receiving audio signals from said corresponding host computer; a user audio interface, for interfacing the secure audio switch with at least one user audio device, wherein said at least one user audio device comprises at least one of a speaker or an earphone; an Audio Output Channel (AOC), coupled to said user audio interface comprises audio security device to reduce data leak by intentionally reducing data rate capable of flowing through said AOC to a maximum rate comparable to the minimal rate required for reproducing human speech, and forcing audio data flow only in the direction to said user audio interface by using an analog audio diode and an analog low pass filter in the audio output channel (AOC).

22 Claims, 20 Drawing Sheets

(51) Int. Cl.
*G06F 3/023* (2006.01)
*G10L 19/002* (2013.01)

(58) Field of Classification Search
USPC ............ 345/163; 710/303; 704/229; 239/18
See application file for complete search history.

(56) References Cited

U.S. PATENT DOCUMENTS

| | | | |
|---|---|---|---|
| 9,158,496 | B2 | 10/2015 | Soffer |
| 9,697,837 | B2 | 7/2017 | Hefetz |
| 2005/0283536 | A1 | 12/2005 | Swanson et al. |
| 2013/0050084 | A1* | 2/2013 | Soffer .................... G06F 3/023 345/163 |
| 2013/0219525 | A1 | 8/2013 | Soffer |
| 2014/0172422 | A1 | 6/2014 | Hefetz |
| 2015/0356045 | A1* | 12/2015 | Soffer .................... G06F 3/023 710/303 |
| 2017/0263260 | A1 | 9/2017 | Hefetz |
| 2017/0263261 | A1 | 9/2017 | Hefetz |
| 2018/0091639 | A1 | 3/2018 | Soffer |
| 2019/0173990 | A1 | 6/2019 | Soffer |

FOREIGN PATENT DOCUMENTS

| | | |
|---|---|---|
| EP | 2629194 A2 | 8/2018 |
| WO | 2011104715 A2 | 9/2011 |
| WO | 2011145095 A2 | 11/2011 |
| WO | 2012095852 A1 | 7/2012 |
| WO | 2018060995 A1 | 4/2018 |
| WO | 2018154569 A1 | 8/2018 |

OTHER PUBLICATIONS

Search Report of PCT International Application No. PCT/IL2017/051085 dated Apr. 1, 2019.

* cited by examiner

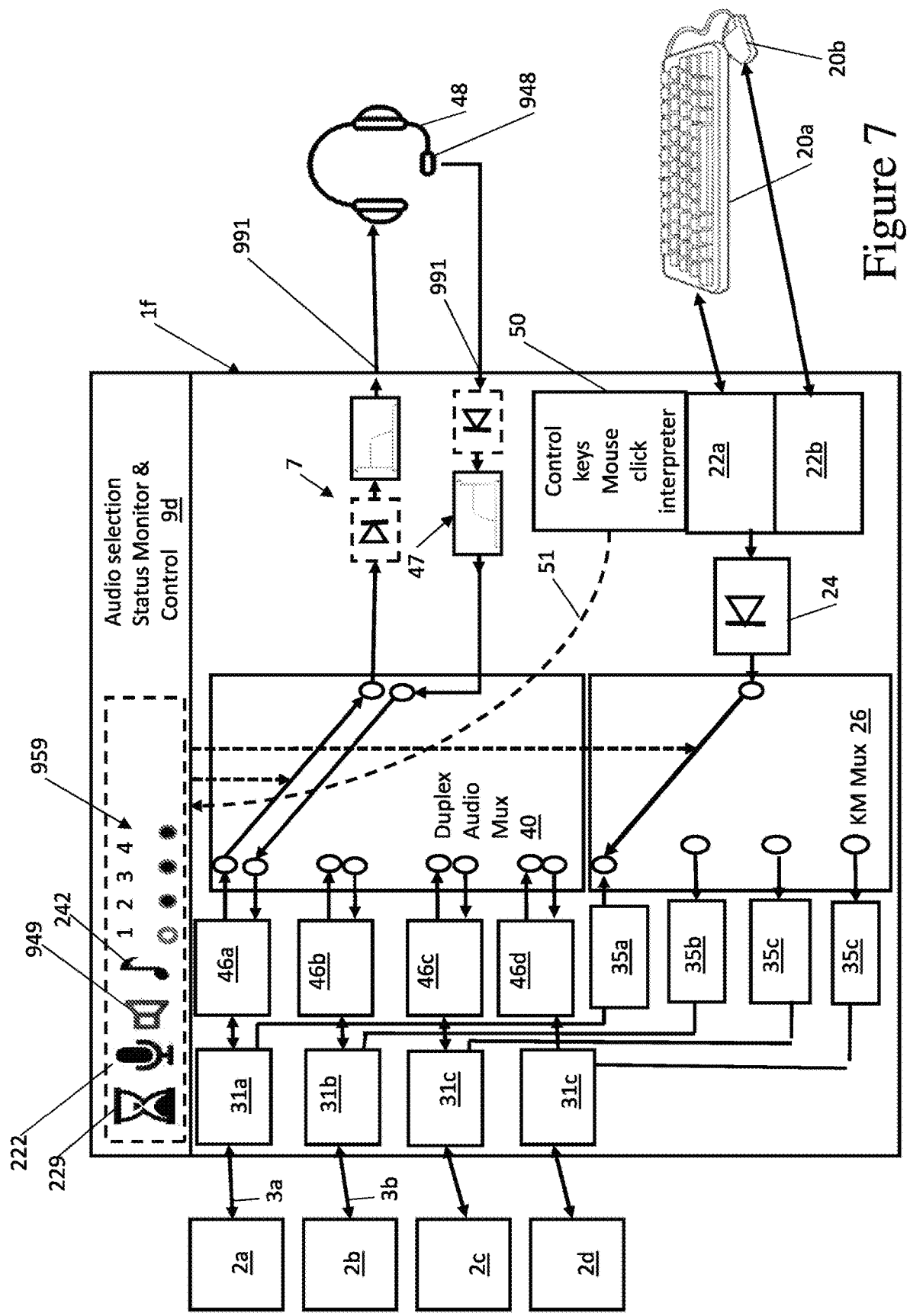

US 11,715,476 B2

SECURE AUDIO SWITCH COMPRISING AN ANALOG LOW PASS FILTER COUPLED TO AN ANALOG AUDIO DIODE

CROSS-REFERENCE TO RELATED APPLICATIONS

This application is a National Phase Application of PCT International Application No. PCT/IL2019/050377, International Filing Date Apr. 1, 2019, entitled "SECURED AUDIO SWITCH", published on Oct. 10, 2019 as International Patent Application Publication No. WO2019/1936590, claiming the benefit of U.S. Provisional Patent Application No. 62/651,277, filed Apr. 2, 2018, which is incorporated herein by reference in its entirety.

FIELD OF THE INVENTION

Embodiments of the present invention relate to a secure audio switch limiting the vulnerability of computer systems having a shared user audio speaker, earphone or headset to data leaks by limiting the bandwidth of the audio channel while allowing voice communication. The secure audio switch may be a stand alone device connected to one or a plurality of host computers, or integrated into a Keyboard Video Mouse (KVM) switch or a Keyboard Mouse (KM combiner).

BACKGROUND

U.S. Pat. No. 9,697,837, "Secured Audio Channel For Voice Communication", to Yaron hefetz, incorporated herein by reference, discloses devices and methods for limiting the vulnerability of computer systems by limiting the bandwidth of the audio channel while allowing voice communication.

WO2018154569, incorporated herein by reference, discloses devices and methods that enhance the security of KVM (Keyboard Video Mouse) matrix.

U.S. Pat. No. 8,769,172, incorporated herein by reference, discloses devices and methods for operating multiple computers from a single console using a secured KVM device, while preventing information leakage between the computers.

U.S. Pat. No. 9,158,496, incorporated herein by reference, discloses devices and methods for enabling a user to use audio devices such as a microphone, speakers or headset when the device is in operational state, while giving to the user a clear visual indication that the audio devices are enabled. The device simultaneously disables the microphone; and turns off the visual indication when the device is in secure state.

Data theft from computers is a serious risk in many organizations. The common use of data storage devices such as USB flash drives, digital cameras, media players and mobile phones that can be easily interfaced with any PC is big security challenge to most organizations. Users may easily download huge number of files in few seconds without leaving any traces. Data theft from computer systems may disclose secret military plans, private medical records, bank accounts information, insurance data, customer database or any other type of data that may be sold or used against the organization interests. Another risk is the data import (or upload) from storage devices that may load hostile code into the organization computing system, or false information. A single event of unauthorized data import into the organization network may cause complete system failure for few hours or even few days. Data Loss Prevention (DLP) becomes a common practice or even mandatory in many high security organizations including: financial, health-care, government and defense.

General information regarding efficient compression of audio data representing human speech may be found in en.wikipedia.org/wiki/Vocoder.

Modern vocoders (VOice enCODER) can code, transmit, decode and faithfully reproduce human speech using as little as 1,200 bps (Bits Per Second) data rate. Lower bit-rates (600 and down to 200 bps) were demonstrated with varying voice quality, but with reasonable intelligibility.

While transmission human speech requires only a limited frequency rage, for example 0 to 1,000 Hz, or less, the specifications of modern sound cards incorporated into computers and other digital electronics is typically supports two sound channels (stereo), each supporting up to 44,000 Hz in order to faithfully reproduce high quality music.

General information regarding USB protocol may be found in en.wikipedia.org/wiki/USB#USB. It should be noted that popular USB protocol, is capable of high speed data transfer. For example USB 1, released in 1996, specified data rates of 1.5 Mbit/s (Low-Bandwidth) and 12 Mbit/s (Full-Bandwidth). USB 2.0, Released in 2000, added higher maximum signaling rate of 480 Mbit/s.

Data theft from computers is a serious risk in many organizations. The common use of data storage devices such as USB flash drives, digital cameras, media players and mobile phones that can be easily interfaced with any PC is big security challenge to most organizations. Users may easily download huge number of files in few seconds without leaving any traces. Data theft from computer systems may disclose secret military plans, private medical records, bank accounts information, insurance data, customer database or any other type of data that may be sold or used against the organization interests. Another risk is the data import (or upload) from storage devices that may load hostile code into the organization computing system, or false information. A single event of unauthorized data import into the organization network may cause complete system failure for few hours or even few days. Data Loss Prevention (DLP) becomes a common practice or even mandatory in many high security organizations including: financial, health-care, government and defense.

Over the past years there were several common strategies to secure computer peripheral ports:

1. Security Policy Regarding Mass Storage Devices.

Some organizations prohibit users from entering the facility carrying mass storage devices, and some conduct searches at the entrance/exit gates. While this method may be efficient deterrent, it is enough that one employee will bring one device to cause severe damage to the whole organization. Additionally, mass storage devices may be easily concealed or disguised.

2. Physical Removal or Cover of Unused Ports.

Many organizations are using brute force to remove unused peripheral ports from computers that they are purchasing. While this method reduces the risks of open ports, it still allows users to remove allowed peripheral such as keyboard or mouse and plug unauthorized peripheral such as portable mass storage device. It is also expensive task to treat every purchased computer and may void the manufacturer's warranty.

3. USB Ports Protection by Software.

This method is in extensive use today and it enables complete port disable, or specific port filtering. Organizations may use these software applications to enable only keyboard and mouse to be attached to their computers. One major drawback of any software protection is that it may be disabled or modified by a sophisticated attacker with relative ease. Commercial products for software protection of USB ports are available.

4. Use of Secure KVM (Keyboard Video Mouse) to Secure Coupled Computers Peripheral Ports.

Several secure KVM units are offering full peripheral ports protection through emulation and unidirectional flow diodes. Combining with USB ports physical or software protection, this method may be used to protect peripheral ports. Another potential option used today is that the PC is located in a secure place or locked from user access while only secure KVM with protected ports is accessible. While this method is relatively secured and efficient, it is generally applicable for users using multiple computers.

PCT patent application WO2011145095; titled "Computer motherboard having peripheral security functions"; to Soffer Aviv; discloses a secure motherboard for a computer, wherein each user-accessible peripheral port is protected by hardware-based peripheral protection circuitry soldered to the motherboard. The protection circuitry provides security functions decreasing the vulnerability of the computer to data theft. User input ports such as keyboard and mouse peripheral ports are coupled to the computer through a security function that enforce unidirectional data flow only from the user input devices to the computer. Display port uses a security function which isolates the EDID in the display from the computer. Authentication device such as smart card reader is coupled to the computer via a port having a security function which enumerates the authentication device before coupling it to the computer. Computer networks in many organizations are continuously challenged by various security threats. The popularity of the internet and the availability of portable mass-storage devices introduce severe internal and external threats to most organizations. Defense and government organizations with higher security networks are forced to isolate their secure networks from other less secure networks thus creating a situation that a single organization or a single employee need to operate in several different isolated networks having different security levels. Isolation between these networks is a key concern as any leakage of data between two networks may cause catastrophic results to the organization involved.

PCT patent application WO2012095852; titled "Secure KM switch"; to Soffer Aviv; discloses a system enabling a computer user to securely share a single set of Keyboard and Mouse (KM) among multiple isolated computers. As isolated computers may have different security levels, the method and apparatus prevents potential data leakages between computers and coupled networks.

PCT patent application WO2011104715; titled "Secure KVM system having remote controller-indicator"; to Soffer Aviv; discloses a Keyboard Video and Mouse (KVM) switch capable of providing secure remote extension of KVM control and indication functions. The secure KVM provides a secure remote extension of the complete user console with support of: remote keyboard, mouse, one or more displays, smart-card reader, audio devices, KVM control and KVM monitoring.

General background information regarding data transmission over analog telephone lines may be found in open Internet sources.

It should be noted that sophisticated modulation techniques used in MODEMs (MOdulator DEModulator) which were popular in the late 1990's achieved data transmission rate of 56 k baud (56,000 bits per second) over a telephone lines having only 3,700 Hz (300-4,000 Hz) bandwidth over kilometers of twisted-pair electric wires. This represents "Frequency Efficiency" (FE) of.about.15. FE is defined as bit-rate divided by bandwidth of the transmission channel FE strongly depends on the Signal to Noise Ratio (SNR) of the transmission line. For high quality channels, larger FE may be achieved. When no noise and no interference are present on the line, the FE may depends on the effective number of bits used in the Digital to Analog Converter (DAC) used for producing the analog signal at the transmitter end and the Analog to Digital Converter (ADC) used for digitizing the signal at the receiving end of the channel. For example, "J-QAM, A QAM soundcard modem" is software for converting a standard sound board into a data transmitting/receiving MODEM. The software, which is available to be downloaded from the Internet, is said to enable the use the soundcard to send and receive data by implementing the QAM modulation scheme. Data can be two ways or one way. Any sort of data can be sent, Files, Video, Audio, WebPages etc. It features: Speeds up to 400 kbs with a sound card. Supports QAM16 and QAM64, Eight state TCM encoding. Includes: Interleaved RS forward error correction, Blind equalization, frequency tracking, and Blind carrier frequency and symbol rate detection. QAM is but one modulation technology. OFDM, ADSL and CDMA may also be used.

General information regarding sound quality of modern computers may be found in open Internet sources. The specifications of the input and output audio channels of conventional PC depend on the type of sound card, or the on-board sound channels used. While top of the line sound cards may reach 192 kHz bandwidth and 32 bits resolution, the typical PC has at least Compact Disk (CD) quality specifications of 44 kHz, 24 bits, stereo input and output channels.

General information regarding computer audio connectors may be found in open Internet sources. The most popular connector is the fully analog 3.5 mm phone connector; these connectors are also often called (mini-)stereo plugs or headphone plugs.

General information regarding efficient compression of audio data representing human speech may be found in open Internet sources. Modern vocoders (VOice enCODER) can code, transmit, decode and faithfully reproduce human speech using as little as 1,200 bps (Bits Per Second) data rate. Lower bit-rates (600 and down to 200 bps) were demonstrated with varying voice quality, but with reasonable intelligibility. Vocoders are available as software packages to be executed on the PC's processor, or as dedicated hardware such as ASICS. For example, the AMBE-2020™ Vocoder Chip (Digital Voice Systems, Inc. 234 Littleton Road, Westford, Mass. 01886, USA) is an extremely flexible, high-performance half-duplex voice compression solution that provides exceptional voice quality at rates as low as 2,000 bps. The AMBE-2020™ Vocoder Chip is a low cost, DSP-based voice codec for half-duplex real and non-real time voice compression applications.

General information regarding USB protocol may be found in open Internet sources. It should be noted that popular USB protocol, is capable of high speed data transfer. For example USB 1, released in 1996, specified data rates of 1.5 Mbit/s (Low-Bandwidth) and 12 Mbit/s (Full-Bandwidth). USB 2.0, Released in 2000, added higher maximum signaling rate of 480 Mbit/s.

Streaming video is in wide use by many individual computer users and many organizations. Streaming video is used for various applications today: from entertainment, to video conferencing, on-line events, training, industrial control, remote sensing and security camera feeds. The use of streaming video in modern organizations causes major information security concerns as video is delivered over IP traffic and IP traffic may contain malicious code. Such malicious code inserted into incoming traffic may infect internal organization networks with viruses and Trojans. Code inserted into outbound video traffic may be used to leak classified information to interested parties outside the organization. To reduce the risks involved with inbound streaming video traffic most organizations are using firewalls with preprogrammed set of policies to handle video traffic.

United States Patent Application 20050283536; to Swanson, Jon N. et al; titled "Real time streaming data communications through a security device"; discloses a method of for connecting a plurality of clients to one another over a computer network for communication of real-time streaming data to one another, with at least one of the clients being separated by a security device from the network.

Details some of the risks and difficulties involving video streaming were published on the Interned and in the press.

SUMMARY OF THE EMBODIMENTS

One general aspect of exemplary embodiments of the current invention is to reduce security risk associated with analog audio channels and peripherals (input and/or output) of computer systems, specifically in an audio switch that can leak information from a high security computer, not connected a network or connected to a high-security network, to a low security computer that may be connected to the internet and infiltrated by a hostile attacker. This risk is associated with one or few of the following:

a) the high speed data transfer that audio channels may support that may allow fast download or broadcast of large amount of sensitive data;

b) the difficulty in monitoring the audio channel, automatically or by a human listener, as offensive data may be disgusted as legitimate music or hidden in parts of the spectrum outside the listener's hearing range;

c) the general lack of security and authentication means associated with audio peripherals which are analog in nature (speakers and microphones) and use fully analog jacks and plug (for example such as 3.5 mm Audio-TRS-Mini-Plug) that offer no security measures.

Exemplary embodiments of the invention comprise strongly reducing the type and speed of data that the audio channel may transmit by: a) compressing the audio data stream by a vocoder to a low bit-rate digital information substantially indicative only of human speech content in the original data; b) ensuring that the low bit-rate digital information is unidirectional and does not exceed the lowest bit-rate actually needed for transmission of the speech content; and c) decoding the low bit-rate digital information back to standard audio signal with a second decoder. Not only that the data transfer rate is reduces many folds, the code-decode method used by the vocoders is highly lossy, and strongly distorts signals that are non-human speech. This may create a formidable barrier to data transfer such as an attempt to transmit text, figures and other type of files.

It is another general aspect of exemplary embodiments to reduce security risk associated with USB audio channels and USB audio peripherals (input and/or output) of computer systems. While USB devices and ports may be authenticated, they generally create an opportunity to an attacker, as once the security measures ate overcome, high speed and highly versatile channel is opened. Embodiments of the current invention limit the maximum of data transfer via a USB port, and limit the type of data that the USB port can support to transfer of human speech. This is done by: a) compressing the audio data stream by a vocoder to a low bit-rate digital information substantially indicative only of human speech content in the original data; b) ensuring that the low bit-rate digital information does not exceed the lowest bit-rate actually needed for transmission of the speech content; and c) decoding the low bit-rate digital information back to standard audio signal with a second decoder.

This methods and devices allow using the versatility and commercial availability of USB ports, USB protocols, USB peripherals, and USB security measures, while limiting the speed and type to data transfer to human speech. Optionally, very low rate, non-speech data exchange is added, restricted to authentication and control data. Other interface standards and protocols may be similarly protected. For example RS232, GPIB (IEEE-488), Ethernet WiFi and other protocols such as WAN or LAN protocols, for example used for voice communication such as VoIP (Voice over IP) may be similarly protected. Thus, other interfacing standards may stand for "USB" in this document, and are within the general scope of the current invention. Other sound protocols such as DTS (Digital Theatre System) may also be similarly protected.

It is another general aspect of exemplary embodiments of the current invention is to reduce security risk associated with audio channels and peripherals (input and/or output) used in KM and KVM switches and combiners used in multi-hosts computer systems. While measures has been taken to eliminate or minimize data leaks via the keyboard, mouse and video channels of KM and KVM switches and combiners, the current invention provides security to the audio channels of such KM and KVM systems and apparatuses.

It should be noted that data leak may be created intentionally by a compromised user attempting to download large amount of data using the audio output channel of the high security host. The data may be recorded and be stolen. Or, in secure facilities where searched are made at the facility exit, the data may be played back into the microphone input and transfer via the non-secure network to a hostile server. Unintentional data leak may be created by introducing a "fake headset" that automatically performs the recording and playback. The current embodiments greatly limit the amount of data that can be compromised.

According to an exemplary embodiment, a secure audio switch is provided comprising: a plurality of host computer interfaces, each for interfacing the secure audio switch with a corresponding host computer, for receiving audio signals from said corresponding host computer; a user audio interface, for interfacing the secure audio switch with at least one user audio device, wherein said at least one user audio device comprises at least one of a speaker or an earphone; an Audio Output Channel (AOC), coupled to said user audio interface comprises audio security device to reduce data leak by intentionally reducing data rate capable of flowing through said AOC to a maximum rate comparable to the minimal rate required for reproducing human speech, and forcing audio data flow only in the direction to said user audio interface; a monitor and control unit, for receiving user's selection of a selected one of said plurality of host computer to be interfaced with said user audio interface, and indicating to the user which of said hosts is currently selected to be interfaced with said user audio interface; and an audio MUX, receiving user selection of the host selected to be interfaced with said user audio interface from said monitor and control unit, and in response, coupling only said selected host computer interface to said AOC.

In some embodiments the secure audio switch further comprises: a user audio input interface, for interfacing the secure audio switch with at least one user audio input device, wherein said at least one user audio input device comprises a microphone; an Audio Input Channel (AIC), coupled to said user audio input interface and to said audio MUX, comprises audio security device to reduce data leak by intentionally reducing data rate capable of flowing through said AIC to a maximum rate comparable to the minimal rate required for reproducing human speech, and forcing audio data flow only in the direction from said user audio input interface, wherein said audio MUX, further coupling only said selected host computer interface to said AIC.

In some embodiments the AOC comprises: a low pass filter for intentionally reducing data rate capable of flowing through said AOC; and a data diode, forcing audio data flow only to said user audio interface and preventing any data from being transmitted from said user audio interface.

In some embodiments the low pass filter configured to pass only frequencies between 1 and 1000 Hz.

In some embodiments the low pass filter configured to pass only frequencies between 20 and 600 Hz In some embodiments the AOC comprises: an outgoing coding vocoder, for receiving outgoing audio signal from said audio MUX, and compressing said outgoing audio signal to an outgoing low bit-rate digital data indicative of human speech included in said outgoing audio signal; an outgoing decoding vocoder coupled to said outgoing coding vocoder for receiving said outgoing low bit-rate digital data generated by said outgoing coding vocoder, and decompressing said low bit-rate digital data to a secure outgoing audio signal, wherein a maximum bit-rate of said outgoing low bit-rate digital data is intentionally limited to bit rate sufficient for transmitting compressed human speech, wherein said secure outgoing audio signal reproduces only said human speech included in said outgoing audio signal when the audio security device is operated in a secure mode.

In some embodiments the d AIC comprises: a low pass filter for intentionally reducing data rate capable of flowing through said AIC; and a data diode, forcing audio data flow only to said user audio interface and preventing any data from being transmitted from said user audio interface.

In some embodiments the low pass filter in said AIC configured to pass only frequencies between 1 and 1000 Hz.

In some embodiments the low pass filter in said AIC configured to pass only frequencies between 20 and 600 Hz.

In some embodiments the AIC comprises: an outgoing coding vocoder, for receiving outgoing audio signal from said user audio input interface, and compressing said outgoing audio signal to an outgoing low bit-rate digital data indicative of human speech included in said outgoing audio signal; an outgoing decoding vocoder coupled to said outgoing coding vocoder for receiving said outgoing low bit-rate digital data generated by said outgoing coding vocoder, and decompressing said low bit-rate digital data to a secure outgoing audio signal, wherein a maximum bit-rate of said outgoing low bit-rate digital data is intentionally limited to bit rate sufficient for transmitting compressed human speech, wherein said secure outgoing audio signal reproduces only said human speech included in said outgoing audio signal when the audio security device is operated in a secure mode.

In some embodiments the AOC further comprising a music bypass switch, wherein said music bypass switch temporarily allows said AOC to transfer data above said maximum rate comparable to the minimal rate required for reproducing human speech, to a music maximum rate required allow reproducing music sound quality, higher than voice sound quality while said music bypass switch is activated, and wherein said monitor and control unit further comprises: a music ON indicator; and a music bypass timer, wherein said music bypass timer activates said music bypass switch and said music ON indicator for a preset duration while music ON state is selected by the user.

In some embodiments the monitor and control unit further capable of receiving user's selection of a selected one of said plurality of host computer to be interfaced with said HID, and indicating to the user which of said hosts is currently selected to be interfaced with said HID, and the secure audio switch further comprising: at least one Host Emulator (HE) for connecting at least one Human Interface Devises (HID), wherein said HID comprises at least one of keyboard or a mouse, wherein said HE is for exchanging bidirectional data with said HID, and generating single unidirectional serial output signals representing commands from said HID; a data diode, forcing flow of said single unidirectional serial output signals only in the direction from said HE; and a KM MUX, controlled by said monitor and control unit, coupling only one currently selected host computer interface to said data diode, wherein said plurality of host computer interfaces further capable of converting said single unidirectional serial output signals received from said KM MUX to bidirectional HID commands to be exchanged with the corresponding host computer.

In some embodiments the user's selection of an active host is causing said active host to be selected as both the selected one of said plurality of host computer to be interfaced with said HID, and the selected one of said plurality of host computer to be interfaced with said user audio interface.

In some embodiments the user's selection of a selected one of said plurality of host computer to be interfaced with said HID may be different than user's selection of the selected one of said plurality of host computer to be interfaced with said user audio interface.

In some embodiments each of said plurality of host computer interfaces is capable of at least: exchanging bidirectional digital data with the corresponding host computer, separating audio input data from said bidirectional data, and transferring said audio input data to said audio MUX.

In some embodiments each of said plurality of host computer interfaces is further capable of converting said audio input data from digital format to analog signal transferred to said audio MUX.

In some embodiments each of said plurality of host computer interfaces is further capable of receiving analog output signal from said audio MUX, converting said analog audio output signal to digital audio output data, and transfer said digital audio output data to the corresponding computer.

In some embodiments the audio switch further comprises: a plurality of host computer video interfaces, each for interfacing the secure audio switch with a corresponding host computer, for receiving video signals from said corresponding host computer; a plurality of video diodes, each coupled to a corresponding host computer video interface, forcing the flow of said video signals only in the direction from said host computer video interfaces; a user video interface, for interfacing the secure audio switch with at least one user display; a video MUX, controlled by said monitor and control unit, for receiving video signals from said video diodes, said video MUX is capable of at least one of:

coupling only selected one of said host computer video interfaces with said user video interface, or combining video signals from at least two host computer video interfaces and send the combined video signal to said at least one user display.

In some embodiments the user's selection of an active host is causing said active host to be selected as: the selected one of said plurality of host computer to be interfaced with said HID, the selected one of said plurality of host computer to be interfaced with said user audio interface, and the selected one of said user video interfaces to be coupled with said user video interface.

In some embodiments the host computer interfaces are USB interfaces.

In some embodiments the HE is a USB host emulator

In some embodiments the user's selection of an active host is causing said active host to be selected as: the selected one of said plurality of host computer to be interfaced with said HID, and the selected one of said user video interfaces to be coupled with said user video interface, but the selected one of said plurality of host computer to be interfaced with said user audio interface may be different than said active host.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the accompanying drawings:

FIG. 7 schematically depicts a secure audio switch according to another exemplary embodiment.

DESCRIPTION OF SELECTED EMBODIMENTS

Figure 1A:
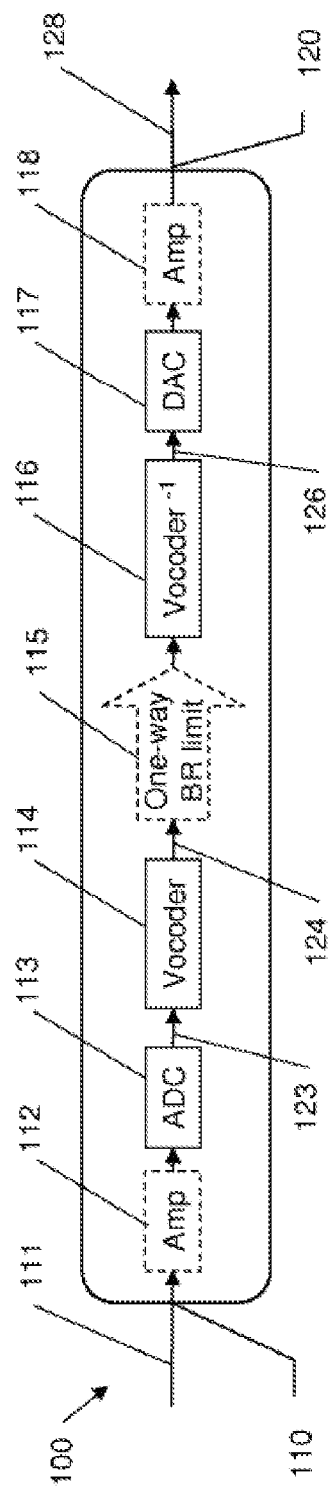
FIG. 1A, adopted from U.S. Pat. No. 9,697,837 schematically showing a Bit-Rate Limited audio channel (BRL), according to the prior art.

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The drawings are generally not to scale.

Some optional parts were drawn using dashed lines.

For clarity, non-essential elements were omitted from some of the drawings.

To the extent that the figures illustrate diagrams of the functional blocks of various embodiments, the functional blocks are not necessarily indicative of the division between hardware circuitry. Thus, for example, one or more of the functional blocks (e.g., processors, memories, controllers, vocoders, etc.) may be implemented in a single piece of hardware (e.g., a general purpose signal processor, ASIC, FPGA, or random access memory, hard disk, or the like) or multiple pieces of hardware. Similarly, the programs may be stand alone programs, may be incorporated as subroutines in an operating system, may be functions in an installed software package, and the like.

It should be understood that the various embodiments are not limited to the arrangements and instrumentality shown in the drawings.

Embodiments of the current invention are aimed at reducing the vulnerability associated with audio channels of computer systems.

Security methods and devices of the art, as disclosed in the background section are aimed to reduce the risk of data leaks from computers, computer systems and computer networks. However, the audio channels of these systems were not protected Eliminating the audio channels altogether may not be desirable, as audio channels may be needed for voice communication.

A typical audio channel having stereo channel of 44 kHz bandwidth, may theoretically be used to transmit 2*44,000*15=1.32 Mbps with modest FE of 15. Taking into account of the high quality (24 bits) of the typical PC's audio channel, and the noise free, interference free, and short length of an audio cord, higher values of FE may be achieved.

Thus, an adversary may turn the audio output of a PC into a high data rate transmitter and used it to transfer data from the computer into a recorder, optionally camouflaged as earphone or headset. This data may be later be transmitted to the adversary's home base. As audio channels may be reconfigured, the microphone input of a PC may be configured to act as an output, thus doubling the data transmission rate. To achieve this goal, a data transmitting code is inserted and executed on the computer having access to secret information and produces audio signal coded with the secret information. Such data transmitting code may be a short program, specifically if simple coding is used and low FE may be tolerated. The audio signal coded with the secret information may be used concurrently with the normal operation of the audio channel and appear as low-level noise signal above the human hearing frequency (~12-15 kHz) and thus go undetected even if it is sound over a loudspeaker together with the normal desirable voice communication. Additionally or alternatively, the coded information may appear as low-level pseudo-white noise that is not noticeable by human listener.

Similarly, secret or hostile information may be transmitted to into a computer at high rate using the audio input channel. This vulnerability may be used for inserting large hostile codes into critical computer systems or to alter important data base. A hostile agent, or innocent personnel may plug an audio player, possibly camouflaged as a fake microphone or a headset into the audio input of the computer and transmit the signals that later translates into undesirable information.

Additionally, these vulnerabilities may be used for overcoming security measures aimed at preventing data leaks between different computers and/or computer networks. For example a headset connected via a KVM switch to two computers, a first computer capable of accessing secret information and the second computer capable of communicating with the adversary's base (for example using the Internet), may be used for receiving secret information from the first computer via the audio output, and than transmitting the information via the audio input of the second computer.

A typical audio channel having stereo channel of 44 kHz bandwidth, may theoretically be used to transmit 2*44,000*15=1.32 Mbps with modest FE of 15. Taking into account of the high quality (24 bits) of the typical PC's audio channel, and the noise free, interference free, and short length of an audio cord, higher values of FE may be achieved.

Thus, an adversary may turn the audio output of a PC into a high data rate transmitter and used it to transfer data from the computer into a recorder, optionally camouflaged as earphone or headset. This data may be later be transmitted to the adversary's home base. As audio channels may be reconfigured, the microphone input of a PC may be configured to act as an output, thus doubling the data transmission rate. To achieve this goal, a data transmitting code is inserted and executed on the computer having access to secret information and produces audio signal coded with the secret information. Such data transmitting code may be a short program, specifically if simple coding is used and low FE may be tolerated. The audio signal coded with the secret information may be used concurrently with the normal operation of the audio channel and appear as low-level noise signal above the human hearing frequency (~12-15 kHz) and thus go undetected even if it is sound over a loudspeaker together with the normal desirable voice communication. Additionally or alternatively, the coded information may appear as low-level pseudo-white noise that is not noticeable by human listener.

Similarly, secret or hostile information may be transmitted to into a computer at high rate using the audio input channel. This vulnerability may be used for inserting large hostile codes into critical computer systems or to alter important data base. A hostile agent, or innocent personnel may plug an audio player, possibly camouflaged as a fake microphone or a headset into the audio input of the computer and transmit the signals that later translates into undesirable information.

Additionally, these vulnerabilities may be used for overcoming security measures aimed at preventing data leaks between different computers and/or computer networks. For example a headset connected via a KVM switch to two computers, a first computer capable of accessing secret information and the second computer capable of communicating with the adversary's base (for example using the Internet), may be used for receiving secret information from the first computer via the audio output, and then transmitting the information via the audio input of the second computer.

FIGS. 1A to 1F were adopted from U.S. Pat. No. 9,697,837 and schematically depict devices and methods for securing audio channel as known in the art.

The full text associated with FIGS. 1A-G may be found in the corresponding patent and will not be repeated here in in full for brevity. These figures explains the use of back-to-back chain of Vocoder and reverse Vocoder as means to drastically reduce the rate of data transfers via an audio channel capable of faithfully transfer human speech. The security device is based on passing the audio signals through a coding Vocoder that receives input audio signal from a computer and compressing the signal to a low bit-rate digital data indicative of human speech; and a decoding Vocoder that decompress the digital data back to a secure audio signal. The data transfer of the protected audio channel is intentionally limited not to exceed the bit-rate needed to carry Vocoder-compressed human speech which is well below the capabilities of unprotected audio channel. Both analog and digital audio ports may be protected. Hardware bit-rate limiter protect the system from software hacking.

FIG. 1A, adopted from U.S. Pat. No. 9,697,837 schematically showing a Bit-Rate Limited audio channel (BRL), according to the prior art.

BRL channel 100 receives analog audio signal 111 at its input 110. Optionally the analog signal is amplified by the optional amplifier 112. The signal may be frequency filtered and its level may be equalized using analog circuitry before it is digitized by ADC 113. A coding vocoder 114 receives and compresses the bit-stream 123 from ADC 113 to digital data 124 indicative of the human speech content of the audio signal in the input 110.

Optionally the digital data 124 passes through an optional Bit-Rate (BR) limiter 115 that prevents data transfer at rate higher than a preset maximum bit rate. Since coding vocoder 114 may be entirely or partially implemented in software, a hardware-based bit-rate limiter, BR 115 may be used to reduce the vulnerability of BRL channel 100 to hostile modifications in the software used in coding vocoder 114. Bit-rate limiter BR 115 may optionally include a one-way data flow enforcing circuit capable of enforcing data flow only in the direction from coding vocoder 114, and preventing any data from flowing in the opposite direction. The one-way data flow enforcing circuit may be implemented using diodes, electro-optical units and the likes. However, it should be noted that other elements in BRL channel 100 may serve the same function, for example ADC 113, DAC 117 and amplifies 112 and 118. Digital data 124 is decoded back into decompressed data stream 126 by the complementary (Vocoder^-1) decoding vocoder 116 which is converted to analog voice signal 128 by DAC 117. Optionally an amplifier 118 is used to amplify the analog audio voice signal 128 before it is connected to a speaker or other audio equipment.

The BRL channel 100 serves the following functions: It limits the data flow to one direction; It limits the maximum data rate to the preset value set by the vocoder 114 or the bit-rate limiter 115; It effectively limits the data transmission to human speech; and It significantly distorts any non-human speech signals (for example fax or modem audio signals), thus hindering non-speech signal transfer.

It should be noted that the BRL channel 100 of FIG. 1 is a single channel single direction device. As computers may require audio input and output, two BRL devices may be used, one for the input (microphone) channel, and one for the output (speaker or earphone) channel. Microphone channel used for voice communication rarely needs stereo channel, however if needed, for example in a video conferencing where directional hearing may be desirable, two separate channels may be used. In this case, some components may be integrated together, such as dual channel vocoder, etc. Alternatively, the left and right audio channels of stereo audio channel may be combined, for example at the input 110 or at the amplifier 112. Similarly, the output channel used for voice communication rarely needs stereo channel, however if needed, for example in a video conferencing where directional hearing may be desirable, two separate channels may be used. In this case, some components may be integrated together, such as dual channel vocoder, etc. Alternatively, the left and right audio channels may be combined, for example at the input 110 or at the amplifier 112. When the left and right output channels are united at BRL, the output 120 may be made to drive both left and right speakers or both earphones. Clearly, reducing the number of channels from two to one reduces to half the maximum data rate that can be transmitted through the audio channel.

The BRL channel 100 may be integrated and manufactured using electronic technology known in the art. The BRL channel 100 may comprise dedicated ASIC or ASICS, optionally the entire device (optionally having a plurality of channels, or both input and output channels) may be integrated into a single electronic chip. Optionally, parts of the BRL may be implemented as a processor or processors executing software code, or a programmable FPGA. However, to reduce hostile manipulation or unauthorized changes in the software, it may be advisable that at least one critical component in the data path, for example coding vocoder 114, the BR 115 and/or decoding vocoder 116 would be immune to hostile reprogramming, for example implemented in hardware or uses code in a non-volatile read-only memory.

It should be noted that coding vocoder 114 and/or decoding vocoder 116 may be constructed to equalize the voice to a reference level, or to ignore voice below a preset threshold level. This will defeat attempts to transfer data at sound level too low to be noticed by the user. Any attempt to transfer data through BRL channel 100 would sound as garbled speech, alerting the user that unauthorized activity is taking place.

While BRL channel 100 appears herein as a single unit, it may be embodied in several parts. For example, vocoder 114 and optional BR limiter 115 may be situated in the computing device transmitting the audio, and vocoder 116 at the receiving end.

Figure 1B:
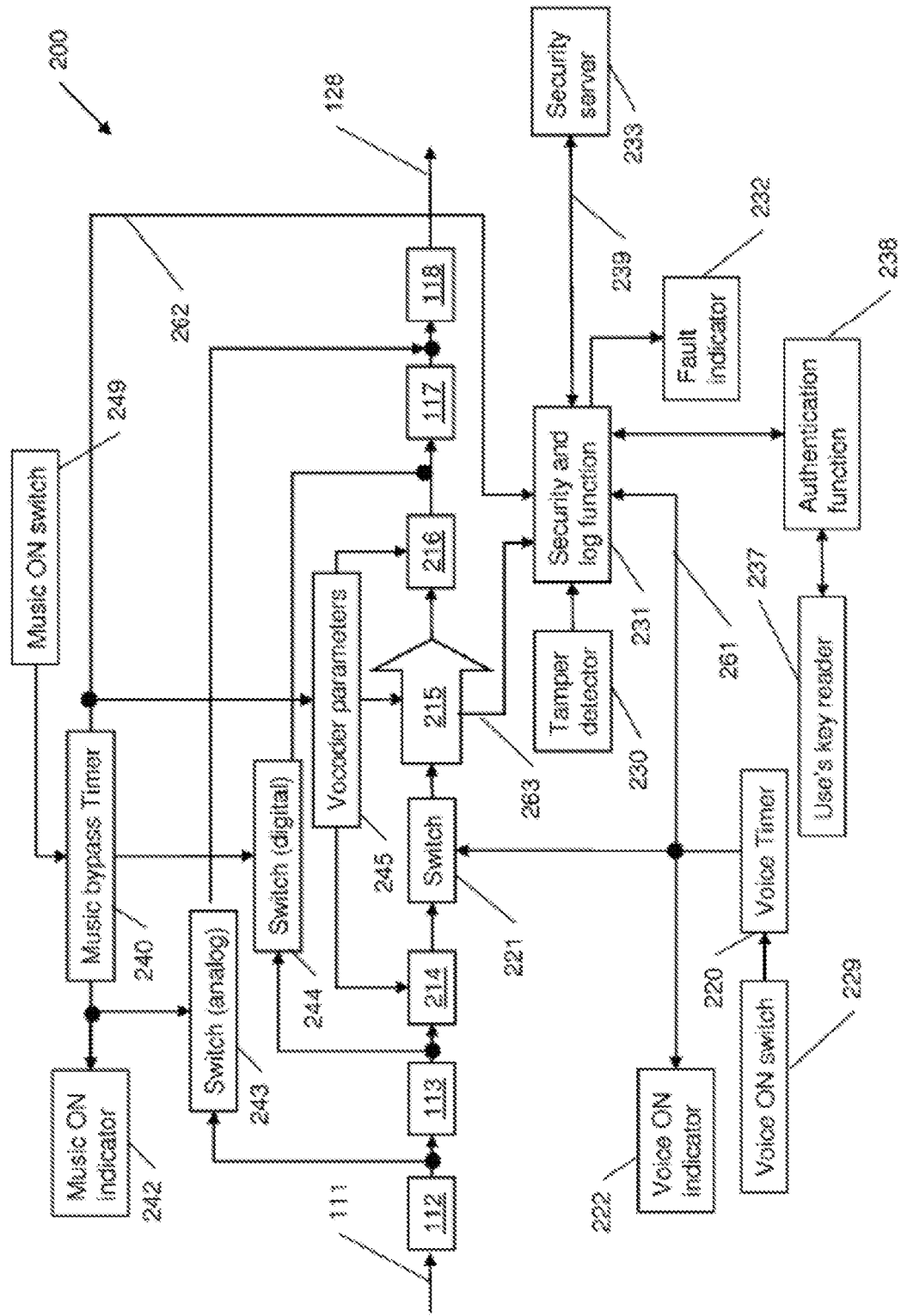
FIG. 1B schematically depicts a block diagram of another embodiment of a BRL circuitry, as known in the art.

FIG. 1B schematically depicts a block diagram of another embodiment of a BRL circuitry 200, as known in the art.

Optionally the BRL channel may comprise additional optional functionalities. For drawing clarity only one audio channel is seen, but it should be noted that duplex (input and output) and/or stereo channels may be used within the scope of the embodiment. Furthermore, the input and output channels may be or may not identical. For example, audio output may be stereo while the input only mono, or the voice quality may not be the same, or other variations and combinations. Optionally, the operation of the input channel and the output channel may not be identical. For example, output (speaker) channel may be enabled at all times, while input (microphone) channel may be operated in a "push to talk" mode.

In an exemplary embodiment, the audio channel is not open at all times, but only open on command of the user, for example by manually activating the voice ON switch 229. Optionally, voice ON switch 229 is a toggle switch and voice channel is on as long as the voice switch 229 is in "ON" position. Alternatively, voice ON switch 229 is a momentary switch that activates a voice timer 220 for a preset duration, and then turns off the voice channel. Activation of voice transmission may optionally be done by activation data switch 221 inserted anywhere along the audio signal or data path. Alternatively, voice transmission may optionally be done by activation any of the components crucial for the operation of the channel such as amplifiers 112 or 118, ADC 113, coding vocoder 214 or decoding vocoder 216 or BR 215. Optionally, a visual indicator such as voice ON indicator 222 is activated to alert the user that voice transition is enabled.

In some embodiments, BRL circuitry 200 is further capable of transmitting audio signals other than human speech, for example music or other high fidelity audio signals. To enable transmitting audio signals other than human speech, the user activates the optional music ON switch 249. In an exemplary embodiment the music ON switch 249 is a toggle switch and music bypass is on as long as the music ON switch 249 is in "ON" position. Alternatively, music ON switch 249 is a momentary switch that activates a music bypass timer 240 for a preset duration, and then turns off the music bypass. Activation of music bypass may optionally be done by one or few of the following: Activation of analog switch 243 that directs the analog signal from the input to the output, bypassing the entire digital circuitry; Activation of raw digital switch 244 that directs ADC data from ADC 113 to DAC 117, bypassing the coding vocoder 214 and decoding vocoder 216 and the BR 215; or Activation of vocoder parameters unit 245 which controls the operation of coding vocoder 214 and decoding vocoder 216 and BR 215 to allow higher quality audio to pass through the BRL.

Optionally, a visual indicator such as music ON indicator 242 is activated to alert the user that music transition is enabled.

Optionally, BRL circuitry 200 further comprises security measures such as tamper detector 230 which is activated if the enclosure of the device is opened, device is removed or disconnected, or other attempt to modify the device is detected. Optionally, the tamper detector is connected to a security function 231 which disables the operation of the BRL if the tamper detector is activated. Optionally, a fault indicator 232 alerts the user if the tamper detector was activated. Optionally, security function 231 is further connected to an external security server 233 via reporting link 239. Security server 233 may be a remote server, or it may be an application operated at the computer which the BRL circuitry 200 is operated with. Optionally, the audio functions of the computer which the BRL circuitry 200 is operated with are halted once a fault is indicated by security function 231. Alternatively, the audio functions of the computer which the BRL circuitry 200 is operated only if security function 231 is in no-fault state. Optionally, security function 231 is further capable of logging and reporting information regarding the operation of BRL circuitry 200, for example times, number and durations of activations of voice ON and/or music ON switches, and/or the rate and total number of bits transmitted through the BRL circuitry 200 as reported by the voice timer, the music bypass timer and the BR 215 via lines 261, 262 and 263 respectively. In some embodiments, reporting link 239 and security server 233 are missing so as not to create another channel of attacking the computer. Other methods of securing reporting link 239 may be used. A monitoring program that monitors the use of the audio channel may be used to detect unauthorized or suspicious activity. For example an increase of data transmission through the channel, or activity in unusual hours which may indicate possible abuse of the audio channel. Optionally, the security function 231 is capable of permanently disable the operation of the BRL circuitry 200 when attempt to abuse it is detected.

Optionally, the BRL circuitry 200 is encased in a tamper resistant enclosure, and the tamper detector 230 is powered by a battery or a capacitor such that an attempt to open the enclosure is detected even when the BRL circuitry 200 is not powered. Optionally, the BRL circuitry 200 is encased in solid resin such as epoxy to prevent tampering with it.

Additionally and optionally, BRL circuitry 200 may comprise an authentication function 238. Authentication function 238 may comprise a unique ID, or other authentication device or algorithm that allows the security server 233 to verify that BRL circuitry 200 is an approved device. In some embodiments, Security server 233 will not enable audio transmission without such verification. Authentication function 238 may optionally comprise a user authentication device such as fingerprint reader, a card reader, or other user's key reader 237 that unlock the BRL circuitry 200 for audio transmission. In some embodiments, a combined verification has to take place wherein the user is authenticated at the PC, for example by using an ID and password, the PC verify that the BRL circuitry 200 is an approved device, and the user is authenticated at the BRL circuitry by inserting his user's key into the authentication function 238 before audio transmission may commence. Optionally, logging function 231 logs and report the user's ID as determined by the user's key.

It should be noted that voice ON switch 220 and/or music ON switch 249 may be a "push to talk" or "push to listen" type, and different switches may be used for the input and output channels. For example, the microphone channel may be a "voice only", mono channel activated by a "push to talk" switch, while the speaker channel may be a stereo channel, set for voice transmission at all times, with a toggle music ON switch. Other variations and combinations may apply. Preferably the security and logging function 231 logs the operation of both the input and output channels.

Figure 1C:
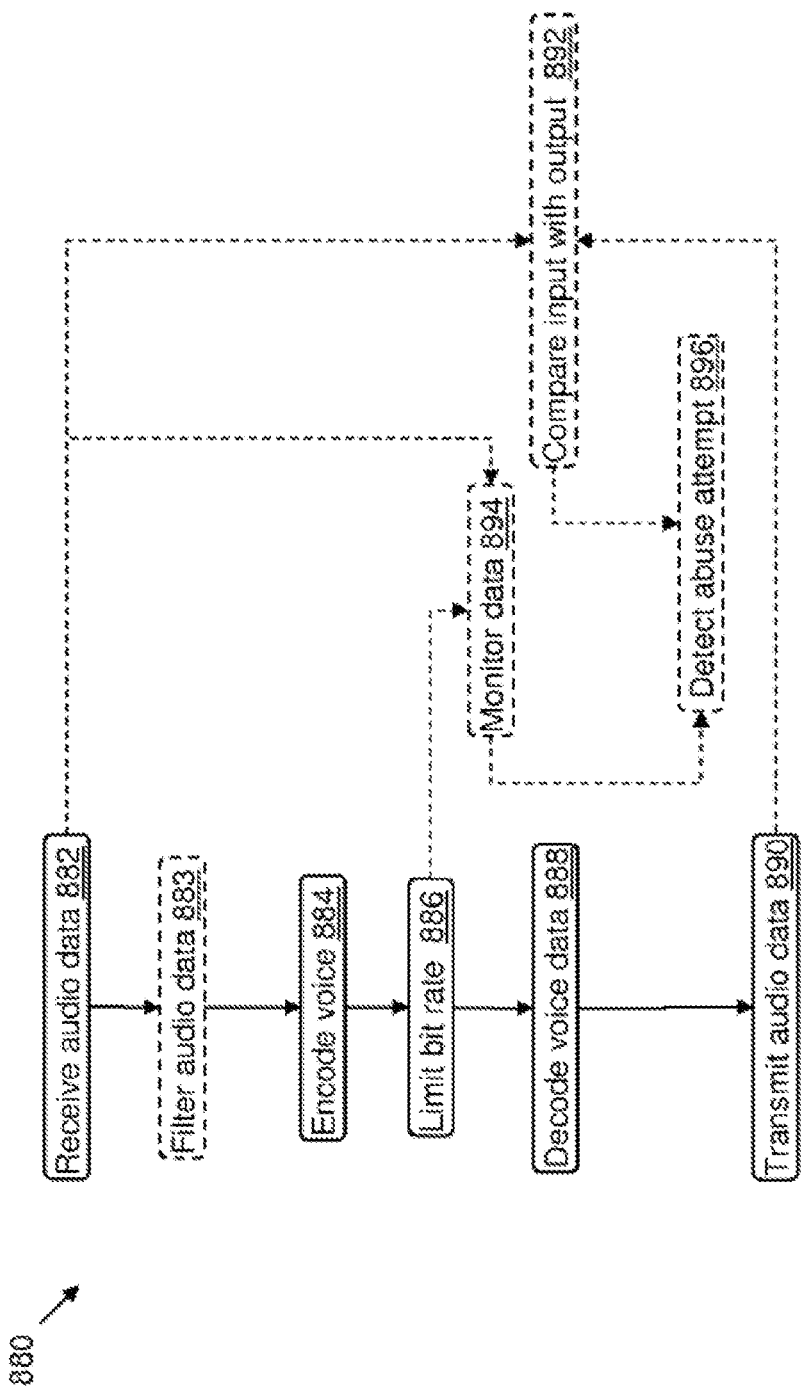
FIG. 1C illustrates a high-level flow chart of a method for providing security for the voice channel according to the prior art.

FIG. 1C illustrates a high-level flow chart 880 of a method for providing security for the voice channel according to the prior art.

Audio data is received 882 in digital or analog or digital form. The human-voice component is encoded 884 to a low bit-rate digital data stream. Bit rate is limited 886 to below a predefined rate as part of the encoding 884, or in a bit-rate limiter. The low bit-rate digital data stream is decoded 888 to voice data in digital or analog form that is transmitted 890 to the destination of the audio data.

Optionally the audio data is filtered. For example, low volume signals which may be below human perception may be filtered out. This type of filtering is sometimes called "squelch". Additionally, optionally or alternatively, frequencies outside the human voice may be filtered out.

Optionally, the data is monitored 894 to detect attempts to abuse the audio channel. For example, the presence of frequencies outside the human voice at the received audio data may be detected. For example, the data rate of the encoded voice is monitored to ensure that it is below the preset value. For example, voice recognition may be applied to the encoded voice to ensure that there was no attempt to transfer non-human voice. Voice recognition may optionally be applied at random sampling times, and may be required to recognize only at least some fraction of the words in the voice data.

Optionally, by comparing 892 the received audio data to the transmitted audio data attempt to transmit non-human voice may be detected.

When attempt to abuse the audio channel is detected 896, a corrective action may be initiated. A corrective action may be one or few of:

a) Alert message sent to the user or to administrator.
b) Stopping the abusing data transmission.
c) Stopping all data transmission until the system is reset by authorized agent.
d) Stopping all data transmission for a preset duration.
e) Permanent disabling (self-destruction) of the audio channel or the audio device.

Figure 1D:
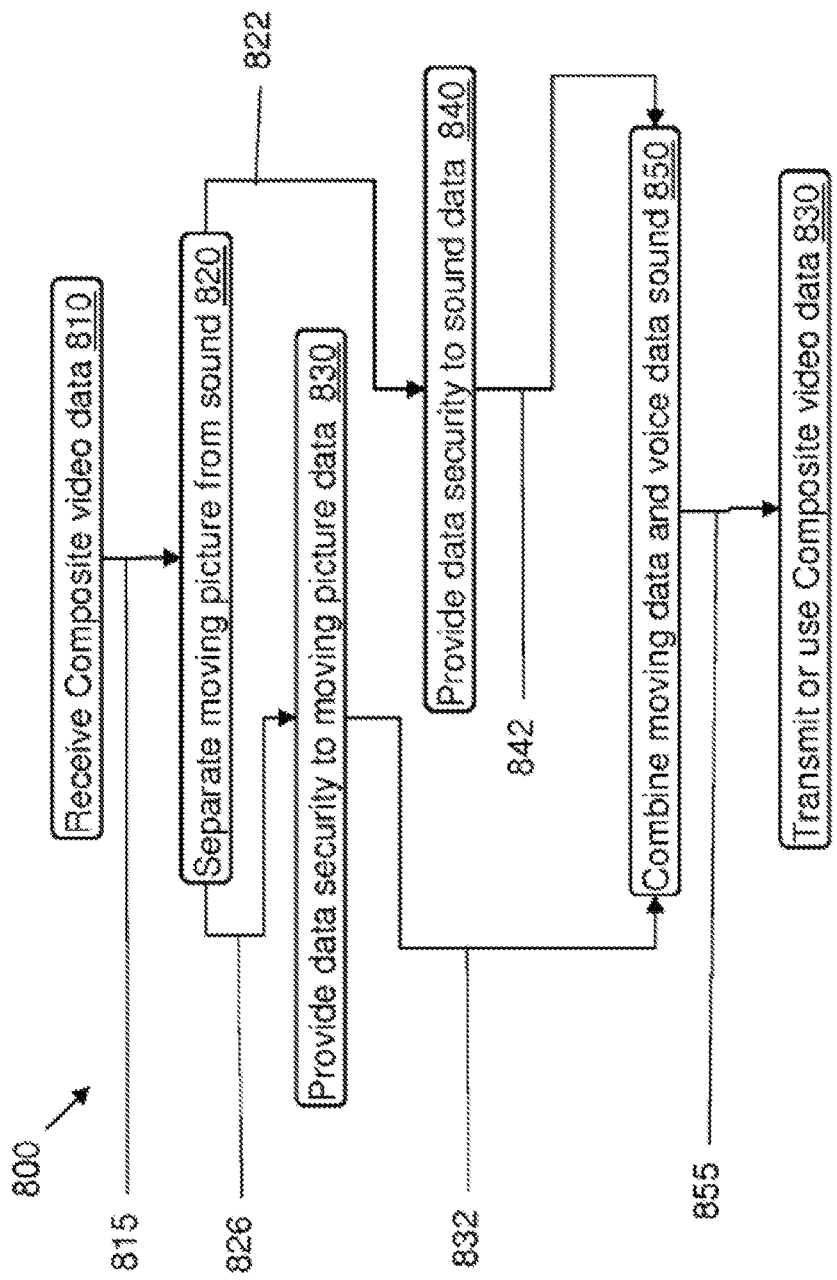
FIG. 1D illustrates a high-level flow chart of a method for providing security for the voice channel associated with video streaming according to another as known in the art.

FIG. 1D illustrates a high-level flow chart 800 of a method for providing security for the voice channel associated with video streaming according to another as known in the art.

It is another general aspect of the exemplary embodiments to reduce security risk associated with audio channels associated with video streaming. While measures, for example as known in the art, have been taken to eliminate or minimize data leaks via the moving pictures in the video, the current exemplary embodiment provides security to the audio channels of that video. This is done by: Receiving 810 a composite video data 815. The composite video data 815 may be in analog, digital or in packets format. Separating 820 the audio data stream 822 from the moving picture data 826 data. Treating 830 the moving picture data 826 separately. Concurrently providing security 840 to the audio data stream 822, for example using BRL 100 or BRL circuitry 200 or the method depicted in FIG. 8 above or 9 below, to create secure voice-only data stream 842. Combining 850 the secure voice-only data stream 842 with the separately treated moving picture data 832 to a secure combined video data 855. Transmitting or using 830 the secure combined video data 855.

In some embodiments, wherein the method 800 is used at the point of generation of the video stream, for example at the video camera system, for example a web-cam or a video conferencing transmission unit, the step of separating the video data may not be needed, and the audio channel is treated before it is combined with the moving picture data.

In some embodiments, wherein the method 800 is used at the point of viewing the video images and listening to the audio associated with the video, for example at the video conferencing viewing system or monitoring system, the step of combining 850 the video data with the audio data may not be needed, and the audio channel is treated before it is connected to the listening device such as a headset or speaker.

A unit executing the method 800 may be implemented within a firewall unit, at the end point computer, or as a dedicated video streaming securing unit.

Figure 1E:
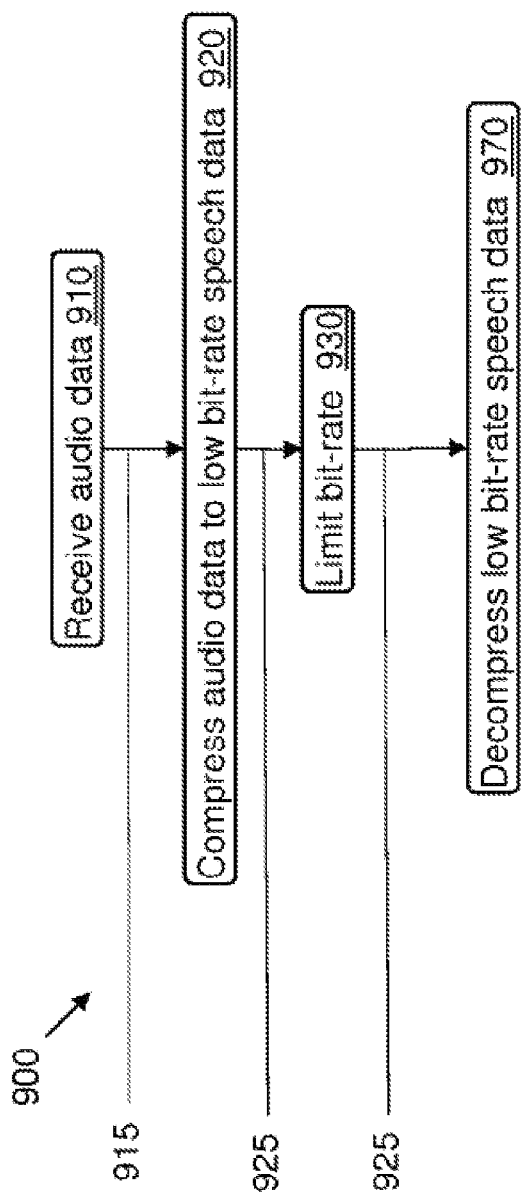
FIG. 1E illustrates a high-level flow chart of a method for providing security for the voice channel as known in the art.

FIG. 1E illustrates a high-level flow chart 900 of a method for providing security for the voice channel as known in the art.

The method 900 comprises: Receiving 910 audio data 915. Audio data 915 may be in analog, digital or in packets format. Compressing 920 with a coding vocoder the audio data 915 to low bit-rate digital information 925 substantially indicative only of human speech content in the original audio data 915. Ensuring 930 that the low bit-rate digital information 925 does not exceed the low bit-rate actually needed for transmission of the speech content. Decompressing 970 the low bit-rate digital information back to standard audio signal with a decoding vocoder. Methods 900 and 880 appear to be similar to the method used in conventional digital voice transmission, for example as used in modern cellular phones or VoIP telephony. However, in contrast to the methods of the art, methods 900 and 880 specifically include bit-rate limitations 930 and 886. In conventional communication system, the bit rate is limited to save communication bandwidth for cost reduction and not for security reasons. Thus, when the audio content require higher bit rate (such as when music is present) the bit rate is automatically increases. Additionally, encoding 920 (882) and decoding 970 (888) are performed at two opposing ends of a communication channel which generally situated at different physical locations and different end user devices. In contrast, in methods 900 and 880, the entire method may be performed at the same location or within the same device, while the long communication channel is before the data receiving 910 (882) or after the data decoding 970 or data transmission 890.

Securing an audio channel may optionally be done without using an encoding vocoder and a decoding vocoder pair. Instead, a filter or a combination of filters may be used. For example, a band-pass filter, designed to pass only frequencies used in human speech may limit the band-width available for data transmission over the audio channel. Such band-pass filter may be set, for example, to transmit frequencies between 300 and 3,400 Hz and still allows reasonable voice quality of the speech. Other frequency ranges may be used. Optionally an adaptive filter may be used that adapts to the specific person currently speaking, and has some latency based on the assumption that one person is speaking at the time, and each speaker speaks for at least a minimal duration. Adapting to the characteristics of the voice of the person currently speaking may allow further reduction of the allowed frequency range, thus further reducing the bandwidth available for non-speech data transmission.

Frequency filtering may optionally be used for monitoring purposes. By monitoring the rejected signals, that is, the components of the signal outside the allowed frequency range, attempt to transmit non-human voice may be detected. Statistical study of the variations in volume and frequency may also distinguish between human voice and non-human voice.

Low volume signals may be rejected by using squelch filtering as was discussed above. Squelch filtering may also optionally be used for monitoring purposes. By monitoring the rejected signals, that is, the components of the signal below the threshold volume, attempts to transmit non-human voice may be detected.

Securing an audio channel by filtering may be done on analog signals, using analog filtering electronics. Alternatively, filtering may be done on digital data representing the audio signal. Such filtering may be performed in time domain, or at the frequency domain after the audio signal is converted to its frequency spectra, for example using FFT algorithms and the likes.

Accordingly, a man skilled in the art of electronics and signal processing may easily replace the chain of encoding vocoder, bit-rate limiter and decoding vocoder with a band-pass filter, optionally together with a squelch filter. Similarly, the monitoring function seen in FIG. 1B and FIG. 1D may be performed by monitoring the rejected signals as depicted above, Mute option is easy to implement, and "music ON" option is implemented by removing the band-pass filter or increasing its frequency range.

Signal filtering may thus replace the chain of encoding vocoder, bit-rate limiter and decoding vocoder in at least some of the embodiments of the invention to follow.

Filtering audio signal may be performed with very low power consumption. For example, band-pass filtering of analog signals may be performed using passive electronics such as coils, capacitors and resistors. Squelch filtering may be performed with non-linear components such as diodes. Active components such as Op-Amps may allow greater flexibility and better performance of the filter at low cost, complexity and power consumption. Similarly, digital filtering may require lower computation power and lower power consumption than a pair of vocoders.

Figure 1F:
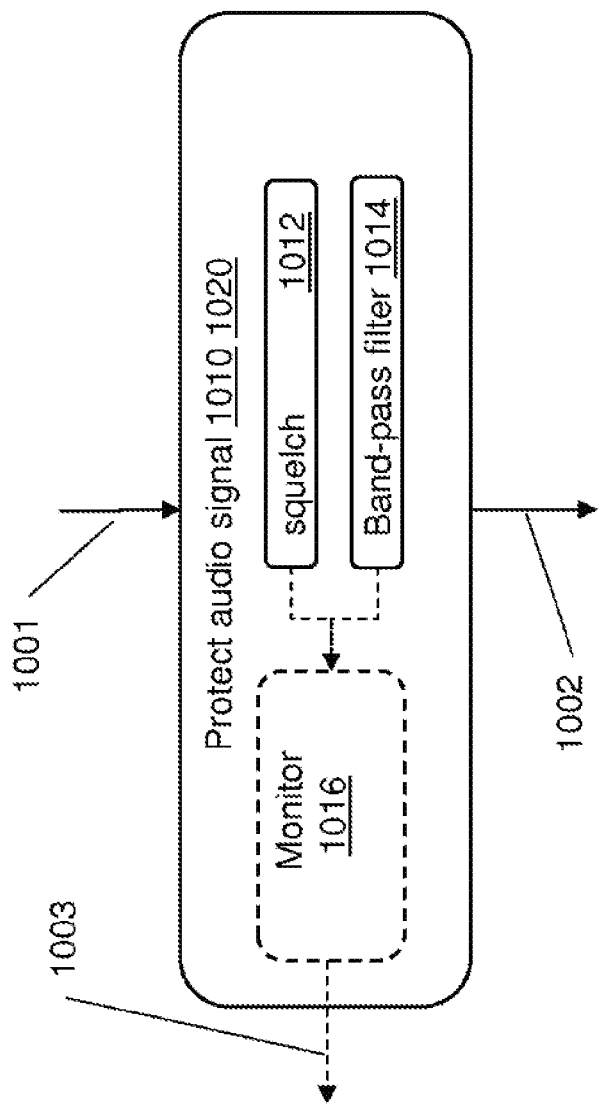
FIG. 1F schematically depicts a filter used for securing an audio channel as known in the art.

FIG. 1F schematically depicts a filter used for securing an audio channel as known in the art.

Raw signal 1001 enters the filter 1010 where it undertows at least bad-pass filtering in band-pass filter 1012, and optionally also squelch filtering 1014 and exit as secure audio signal 1002. Optionally monitoring function 1016 provides abuse alert signal 1003 to be used with an optional security function control and monitoring unit 9x (seen in FIGS. 3A-9B), or an external security system (not seen in these figures for figure clarity). It should be noted that other types of filters may be applied within 1010 step to protect audio signal when used in a method, or an audio signal protecting hardware unit 1020 in a device or system. Order of applying the various filters may be altered or changed.

Figure 1G:
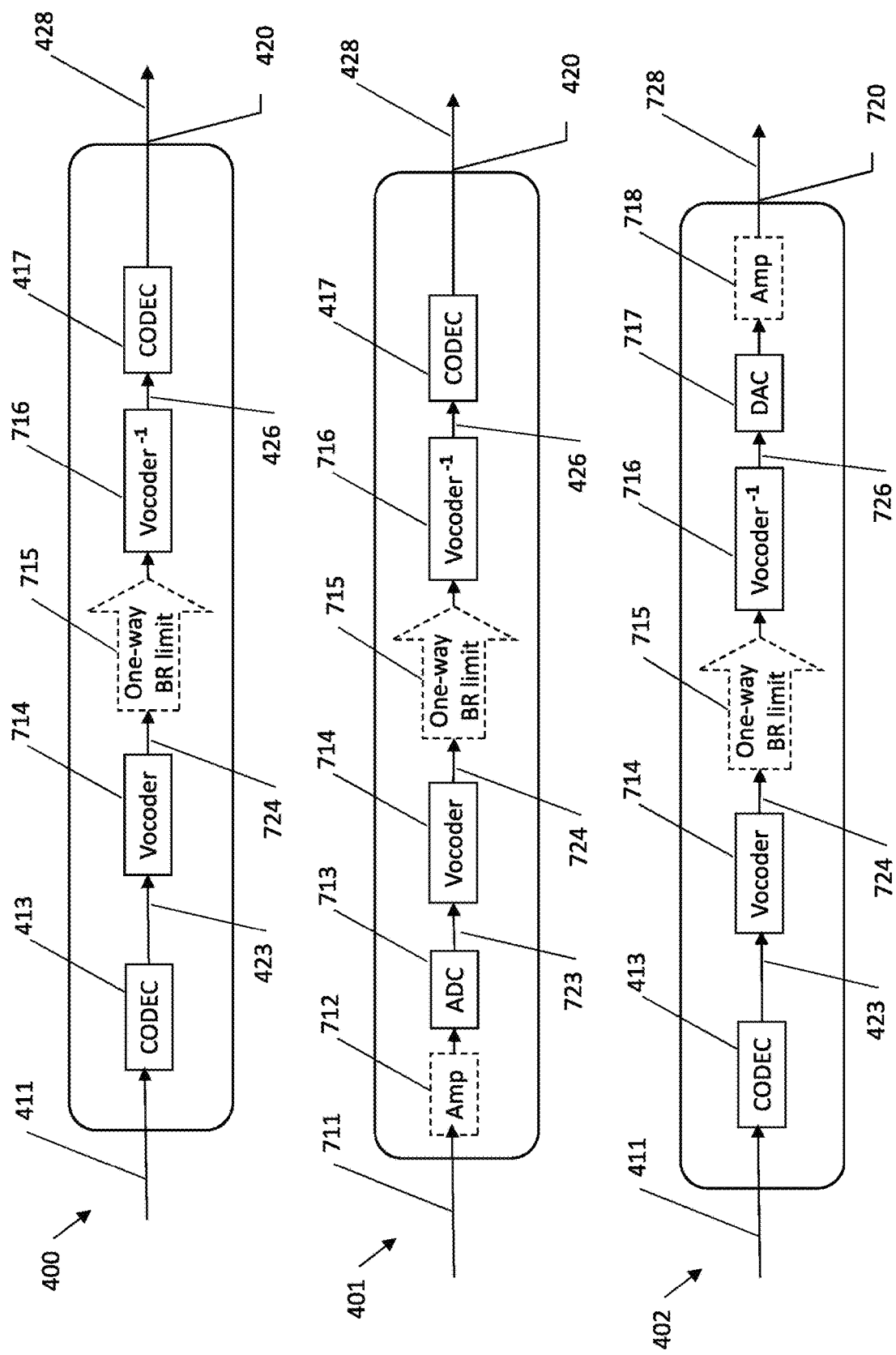
FIG. 1G were adopted from PCT application WO2018154569 and schematically depicts digital Bit-Rate Limited audio channels (BRL) as known in the art.

FIG. 1G were adopted from PCT application WO2018154569 and schematically depicts digital Bit-Rate Limited audio channels (BRL) 400, 401 and 702 as known in the art.

BRL 400 differs for the embodiments seen in FIGS. 1A and 1B in that the audio input and audio output signal 428 are digital, in contrast to analog audio input signal 111 and analog voice signal 128 of FIGS. 1A and 1B.

In a predominantly digital system it may be advantages to use CODEC 413 to convert data bit stream 411 (standing for analog audio signal 711, in audio protocol or in packets) to make it compatible with the bit-rate limiting mechanism such as the vocoder 714 and 716 chain, or in the more complex device 200 seen in FIG. 1B.

Similarly instead of outputting an analog voice signal 128 (as in FIGS. 1A-B), CODEC 417 produces a digital a low-rate data bit stream 428.

Analog-Digital hybrid 401 can be easily designed wherein the input is analog and the output id digital, or a Digital-Analog-hybrid 402 *d* wherein the output is analog and the input is digital.

Figure 2A:
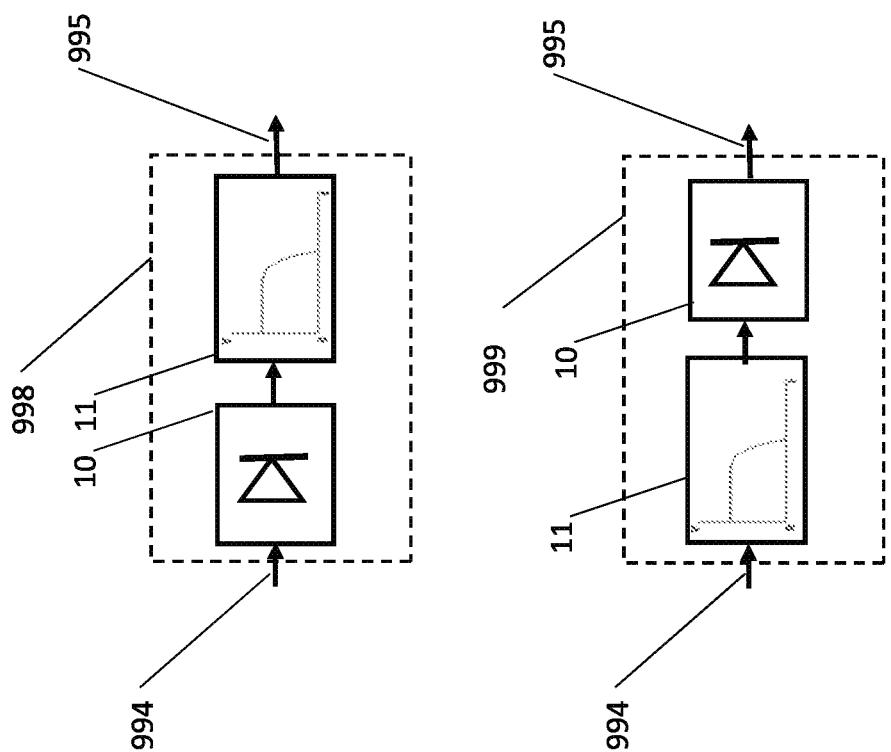
FIG. 2A schematically depicts audio filters, according to exemplary embodiments

FIG. 2A schematically depicts audio filters 998 and 999, according to exemplary embodiments Audio filter 998 is an audio security devices to reduce data leak which comprises:

An audio diode 10 that prevents any signal from returning from audio output 995 back to audio input 994; and A Low-Pass Filter (LPF) 11 which reduces the risk of high-speed data transfer via Audio filter 998. LPF 11 may include other risk reduction means as disclosed in FIG. 1F such as (optionally adoptive) band filter, and "squelch" function.

Note that the order of the LPF 11 and the audio diode 10 may be reversed as in audio filter 999.

It should be noted that audio filters 998 and 999 may be purely analog devices, comprising passive components such as diodes, coils, capacitors and/or resistors, or it may further comprises active electronics such as amplifiers and the likes. Alternatively, audio filters 998 and 999 may be purely digital devices. Alternatively yet, audio filters 998 and 999 may comprise both digital and analog components.

For added security, it is preferred that audio filters 998 and 999 cannot be reprogrammed or hacked, thus if digital components are used, care is taken to make malicious reprogramming impossible or at least very unlikely.

Figure 2B:
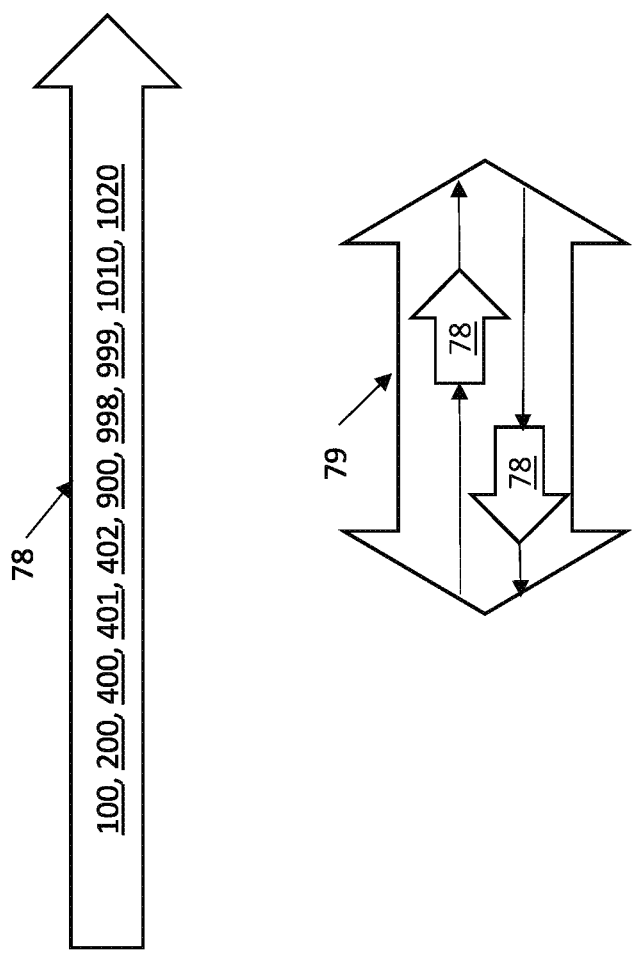
FIG. 2B schematically depicts unidirectional audio security component and a bi-directional audio security component, according to exemplary embodiments.

FIG. 2B schematically depicts unidirectional audio security component 78 and a bi-directional audio security component 78, according to exemplary embodiments.

For reducing cluttering the following figures, any of the unidirectional BRLs and other audio filtering or securing components such as 100, 200, 400, 401, 402, 900, 998, 999, 1010, and 1020 could be marked as unidirectional audio unit 78.

A bi-directional audio security unit 79 may be constructed by placing two audio units 78, side by side, and with the opposite directionality.

It should be noted t audio unit 78 may be stereo or mono, and audio security unit 79 may be may be stereo or mono, or stereo in one direction and mono in the other direction.

Figure 3A:
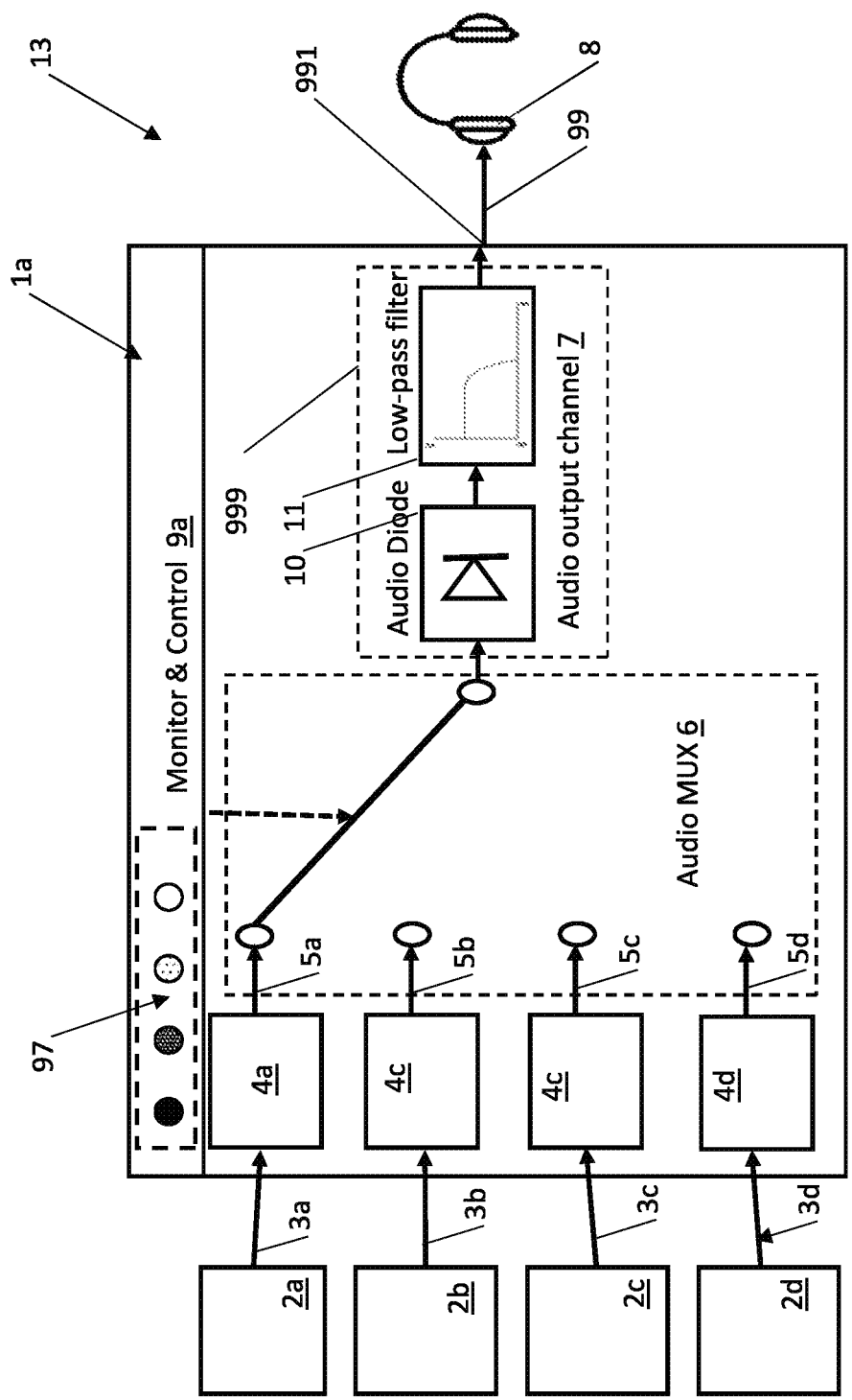
FIG. 3A schematically depicts a secure audio output switch according to an exemplary embodiment.
Figure 3B:
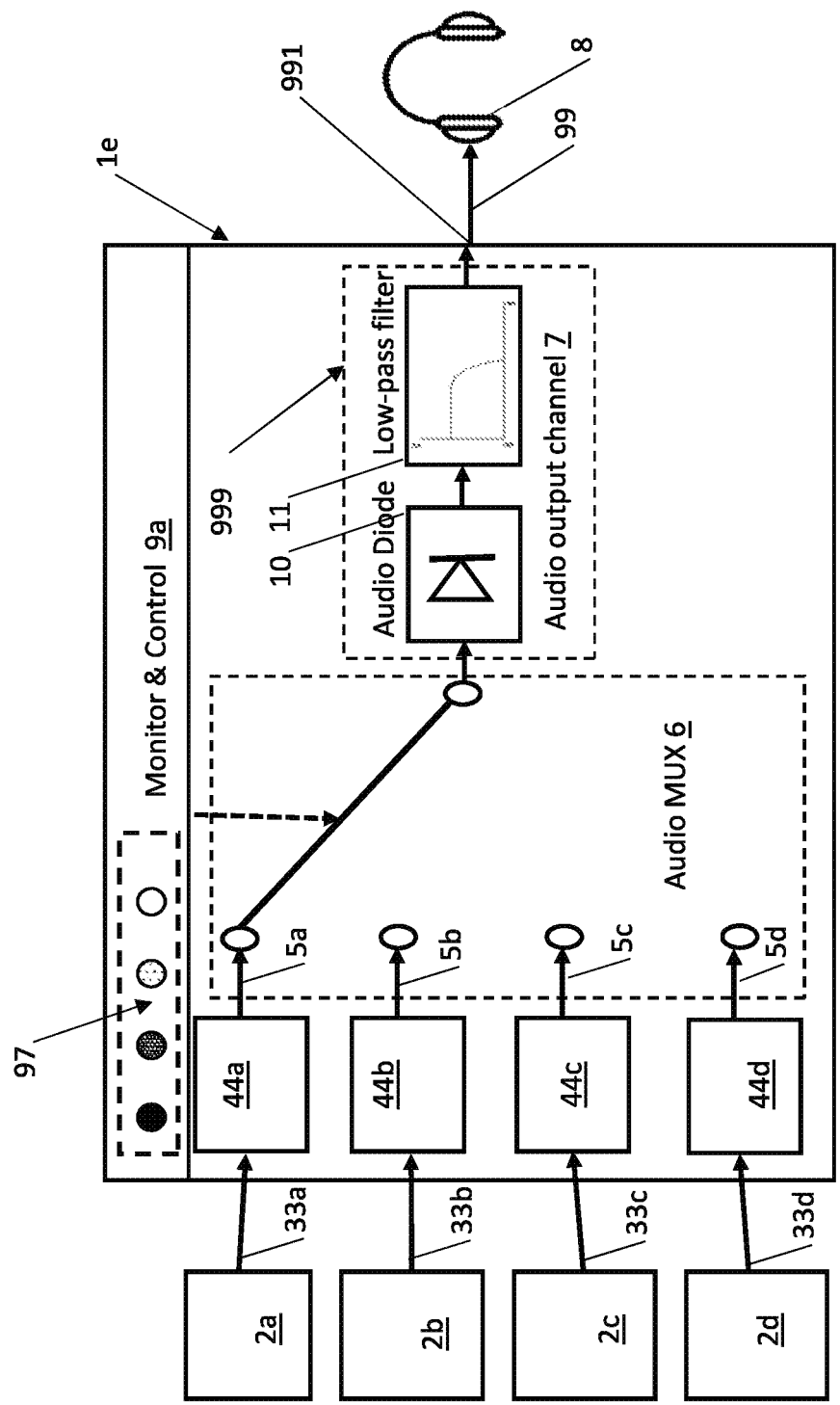
FIG. 3B schematically depicts a secure analog audio output switch according to an exemplary embodiment.

FIG. 3A schematically depicts a secure audio output switch 1a according to an exemplary embodiment.

Secure audio output switch 1a has a digital input audio signals and analog output audio signal.

Computer system 13 comprises a plurality of host computers 2x (In this figure, four hosts, marked 2a-2d are seen, but number of hosts may be less (including one) or more.

In discussion of the various figures described herein below, like numbers refer to like parts. In these figures, the letter "x" when follows an element number (as in 1x herein, which stands for 1a and 1b seen in FIGS. 3 and 4 respectively, may stand for any letter such as (a, b, c . . . ) to identify any one of a plurality of identical or similar elements, all having the same element numeral.) In some of the figures only one or few of the elements having the same numeral are marked.

Each host computer 2x is coupled to secure audio output switch 1a using data channel, for example USB cables 3x. Each host computer 2x is coupled to a corresponding audio DAC 4x within the secure audio switch 1a. Audio DAC 4x is configured for bidirectional communication with the corresponding host 2x, receiving digital audio data from the corresponding host computer 2x and converting the data to a corresponding analog audio signal 5x.

Analog audio multiplexor (MUX) 6 connects one analog audio signal 5x at a time to the output audio channel 7 which is coupled to a user Earphones, Headset or Speakers (User Audio UA) 8 with analog user audio cable 99.

Generally, AU 8, and other user audio devices are connected to an audio switch at a user audio interface 991 such as audio jack. Audio interface 991 may be an output only (as used with a speaker or earphones), and may be stereo or mono type. In other embodiments, user audio interface 991 may further comprise audio input (as used with a speaker or earphones and additional microphone, headset or other audio input devices). In some embodiments audio interface 991 is analog interface. In some embodiments audio interface 991 is digital interface for connecting to digital user audio devices.

Monitor and control unit 9a, for example a set of pushbuttons 97 or a rotary dial enables the user to select the specific selected host 2x. Optionally, monitor and control unit 9a further comprised clear indications as to the identification of the currently selected host. For example lighted pushbuttons may be used, or a touch-screen may act as both selector and indicator.

Audio output channel (AOC) 7 comprises audio security devices to reduce data leak in system 2 which may include:

An audio diode 10 that prevents any signal from returning from UA 8 back to any of the hosts 2x; and Low-Pass Filter (LPF) 11 which reduces the risk of high-speed data transfer via the AOC 7. LPF 11 may include other risk reduction devices as disclosed in FIG. 1F such as (optionally adoptive) band filter, and "squelch" function. Note that the order of the LPF 11 and the audio diode 10 may be reversed.

Optionally AOC 7 comprises risk reduction devices as disclosed in FIGS. 1A-C and 1E, FIG. 3B schematically depicts a secure analog audio output switch 1e according to an exemplary embodiment.

Secure audio output switch 1e has analog input audio signals and analog output audio signal.

Each host computer 2x is coupled to secure audio output switch 1e using analog audio cables 33x. Optionally, each host computer 2x is coupled to a corresponding audio buffer amplifier 44x the rest of secure analog audio output switch 1e is the same as the secure audio output switch 1a.

Figure 4:
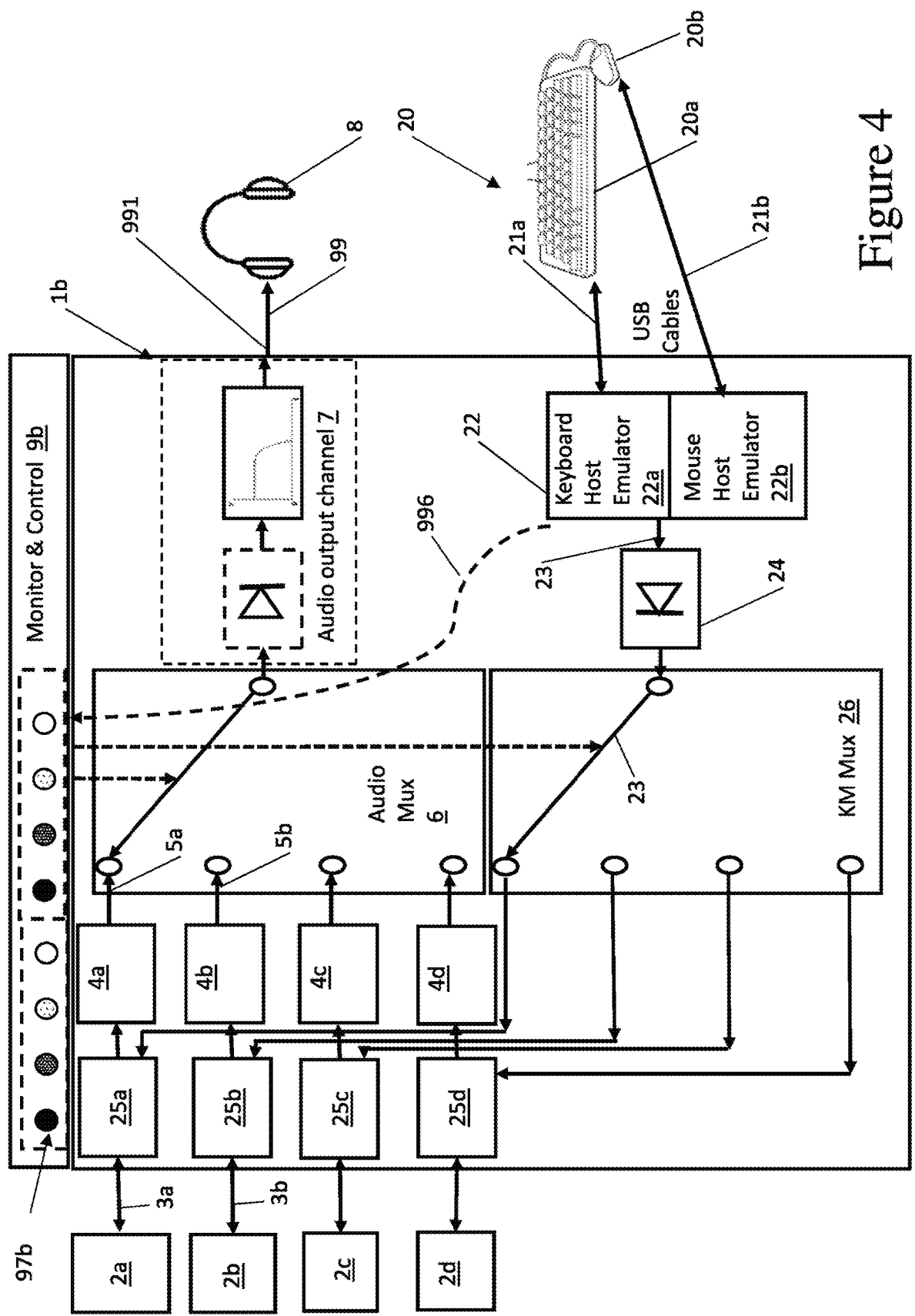
FIG. 4 schematically depicts a secure Keyboard, Mouse, Audio Output (KMAO) switch according to another exemplary embodiment.

FIG. 4 schematically depicts a secure Keyboard, Mouse, Audio Output (KMAO) switch 1b according to another exemplary embodiment.

KMAO switch 1b switch comprises the functionalities of audio output switch 1a (which are not explained herein to reduce cluttering), and further enable interfacing user Human Interface Devises (HID) 20 to the selected host computer 2x at a time. HID 20 (20x) preferably comprise at lease a keyboard 20a and a mouse 20b, but may include other HID devices. In the depicted exemplary embodiment, each HID 20x interfaces via a corresponding bidirectional USB cable 21x to a corresponding Keyboard Host Emulator (KHE) 22a, and Mouse Host Emulator (MHE) 22b respectively. KHE 22a converts standard keyboard commands to a unidirectional data stream, while rejecting all unauthorized or unrecognized USB devices or USB command. MHE 22a converts standard mouse commands to a unidirectional data stream, while rejecting all unauthorized or unrecognized USB devices or USB command. Combined unidirectional data stream 23 from HE 22 is optionally passed through data diode 24 and is fed to KM MUX 26. It should be noted that other configuration could be used, for example (MHE) 22b and KHE 22a may be combined in a single Host Emulator (HE) 22, and an external USB Hub (for example as commercially integrated in some keyboards) may be used such that only one USB cable 21x is needed. Alternatively USB hub is located within the KMAO switch 1b, or in HE 22.

KM MUX 26 is optionally controlled by the monitor and control unit 9b and route the combined unidirectional data stream 23 to the selected one of the USB Keyboard Mouse Audio Emulator (KMAE) 25x. Each KMAE 25x is in bidirectional uninterrupted communication with the corresponding host 2x.

Optionally monitor and control unit 9b to allow selecting a first host for audio connection and an optionally different (or same) second host for interfacing with the keyboard and mouse. Additionally or alternatively, this selection may be done with control keystrokes reported by selection channel 996, Monitor & Control 9b my optionally be adopted to show, and optionally differently select 97b the state of audio MUX 6 and KM MUX 26.

Each KMAE 25x is in bidirectional communication with its corresponding host computer 2x. It converts the unidirectional data stream 23 to USB keyboard and mouse commands and presents these commands to the corresponding host. Each KMAE 25x also transfer to its corresponding DAC 4x digital audio data from its corresponding host computer 2x.

Figure 5:
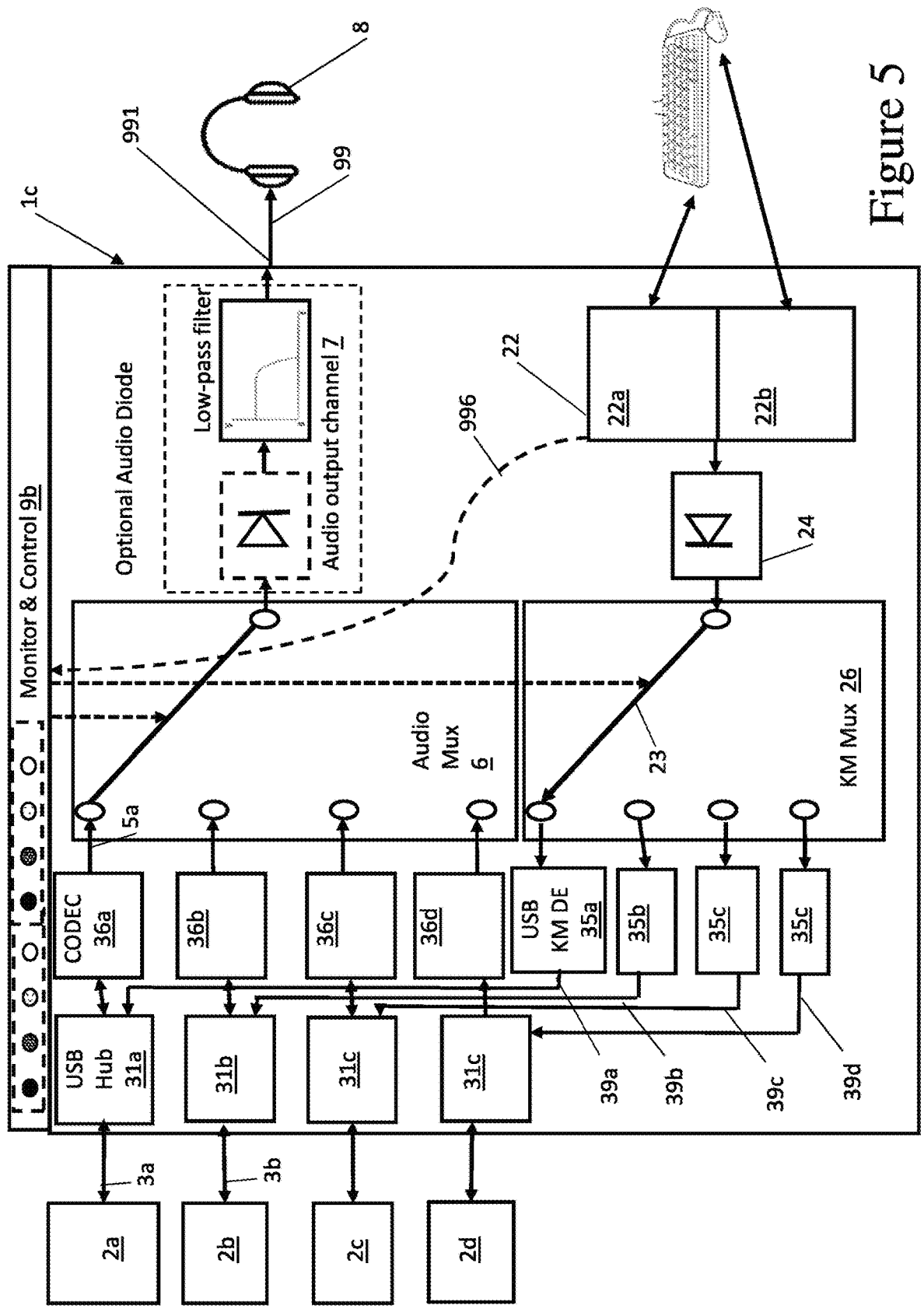
FIG. 5 schematically depicts a secure Keyboard, Mouse, Audio Output (KMAO) switch according to another exemplary embodiment.

FIG. 5 schematically depicts a secure Keyboard, Mouse, Audio Output (KMAO) switch 1c switch according to another exemplary embodiment.

In KMAO switch 1c, audio DACs 4x are optionally replaced with CODECs 36x, each of which bidirectionally communicates with a corresponding USB UHB 31x, receives audio data from its corresponding host 2x via the corresponding USB Hub 31a, and convert the digital audio data to output analog audio signal 5x. One selected output analog audio signal 5x is selected by audio MUX 6 to be sound in UA 8 after passing through the audio output channel 7.

Unidirectional KM commands 23 are converted to bidirectional USB commands 39x by the selected USB KM Device Emulator (KMDE) 35x which is connected to a corresponding USB UHB 31x. Optionally, KMDE 35x is configured to receive and convert only standard keyboard and mouse commands, thus adding security to the system.

Figure 6:
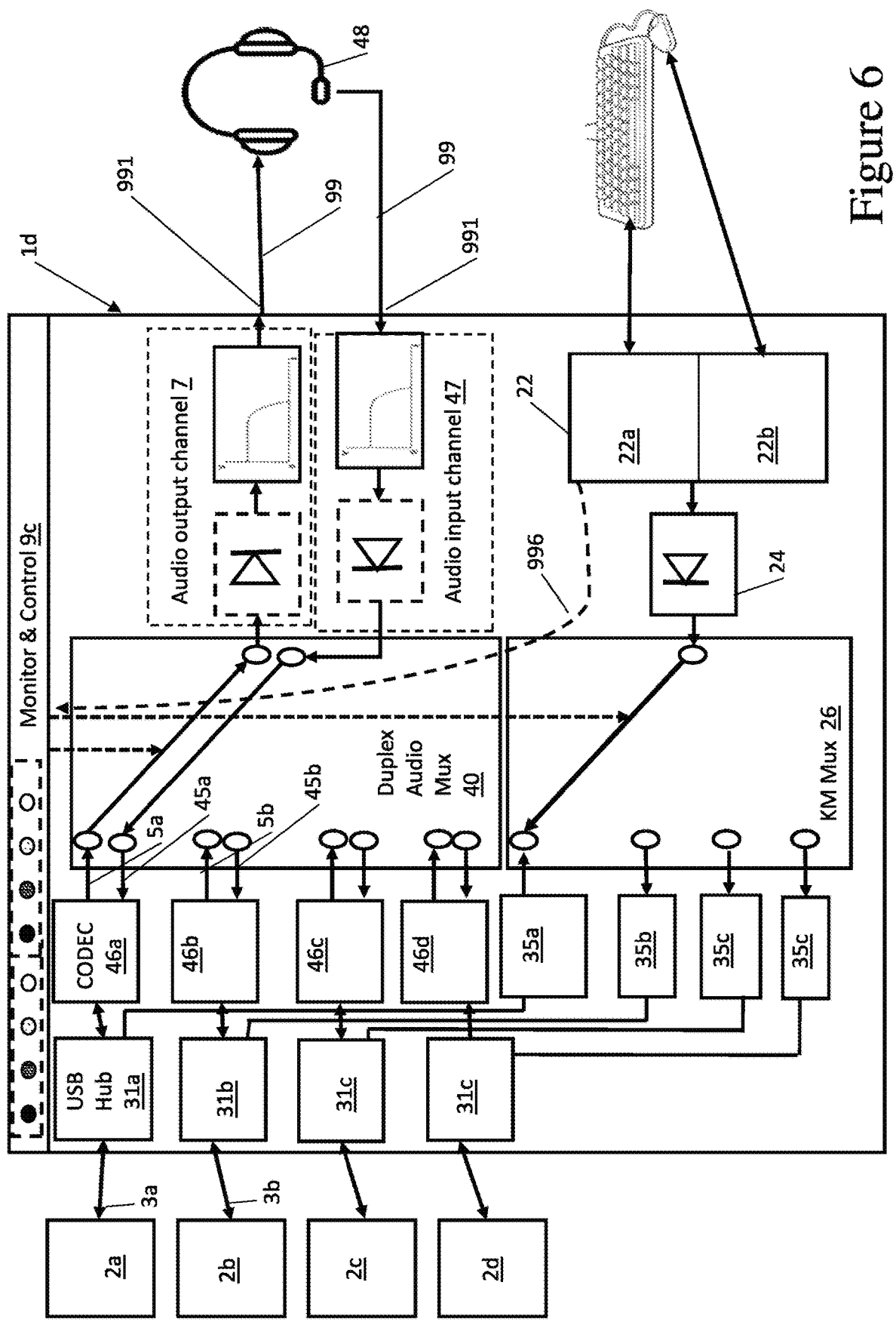
FIG. 6 schematically depicts a secure audio input-output (AIO) switch according to another exemplary embodiment.

FIG. 6 schematically depicts a secure audio input-output (AIO) switch 1d according to another exemplary embodiment.

AIO switch 1d enables input and output audio communication between the user headset, or user speaker(s)/Earphone and microphone (Head Set HS) 48 and the selected host computer 2x. To reduce cluttering, only the differences from FIG. 5 are marked and detailed in the text. xxx CODECs 46x each of which bidirectionally communicate with a corresponding USB Hub (UHB) 31x, receives digital audio data from its corresponding host 2x, and convert it to output analog audio signal 5x. Each ODECs 46x further capable of receiving input analog audio to the corresponding signal 45x and convert it to input digital data stream and transmit the input digital data stream to the corresponding USB UHB 31x.

AIO switch 1d comprises a duplex audio MUX 40 which connects the selected output audio signal 5x to the output audio channel 7, and the selected input audio signal 45x to the audio input channel 47.

Audio input channel 47 is similar or essentially identical to the audio output channel 7.

It should be noted that elements of output audio channel 7, and/or audio input channel 47, for example the LPF or Audio diode may be integrated into Audio DAC 4x, CODEC 36x or CODEC 46x.

Optionally monitor and control unit 9c may additionally allow selecting a first host for audio output connection and a different second host for interfacing with audio input.

FIG. 7 schematically depicts a secure audio switch if according to another exemplary embodiment.

Secure audio switch if further comprises a control keys and mouse click interpreter which 50 is configured to extract user switching and host selection commands from data from user keyboard 20a and mouse 20b and command the Audio Selection Status Monitor and control unit 9d via command line 51.

In some embodiments, activation the microphone may expose the user to eavesdropping and additional data leak. Optionally, unmuting the microphone is limited by a countdown timer (for example voice timer 220 seen in FIG. 1B). Optional "voice on" indicator 222 preferably indicates when the microphone 948 is active. Optional indicator 229 indicates to the user the time left before the microphone activation time expires.

Additionally, and optionally, in some embodiments, disabling the LPF is possible, for example to transfer music, or other non-human voice sound. Optionally, disabling the LPF is possible is limited by a countdown timer (See details in FIG. 1B). Optional "music on" indicator 242 preferably indicates when the optional non-voice sound transfer is enabled. Optionally, non-voice sound transfer is enabled only in one direction, for example from host 2x to the user, but not in the other direction.

Since data may be leaked from hosts 2x via audio output channel 7, the output channel may optionally also be disabled. Optional "output audio on" indicator 949 may be used to indicates when the audio output is enabled.

Audio Selection Status Monitor and control 9d may optionally further comprise a status display 959 showing information such as:

ID of host controlled by keyboard and mouse;
ID of host outputting audio to earphones or speaker.
ID of host receiving audio from microphone or headset.
Microphone active/mute (222).
High quality audio (music) enabled/disabled (242).
Timed activation of audio or enabled (229).

Figure 8A:
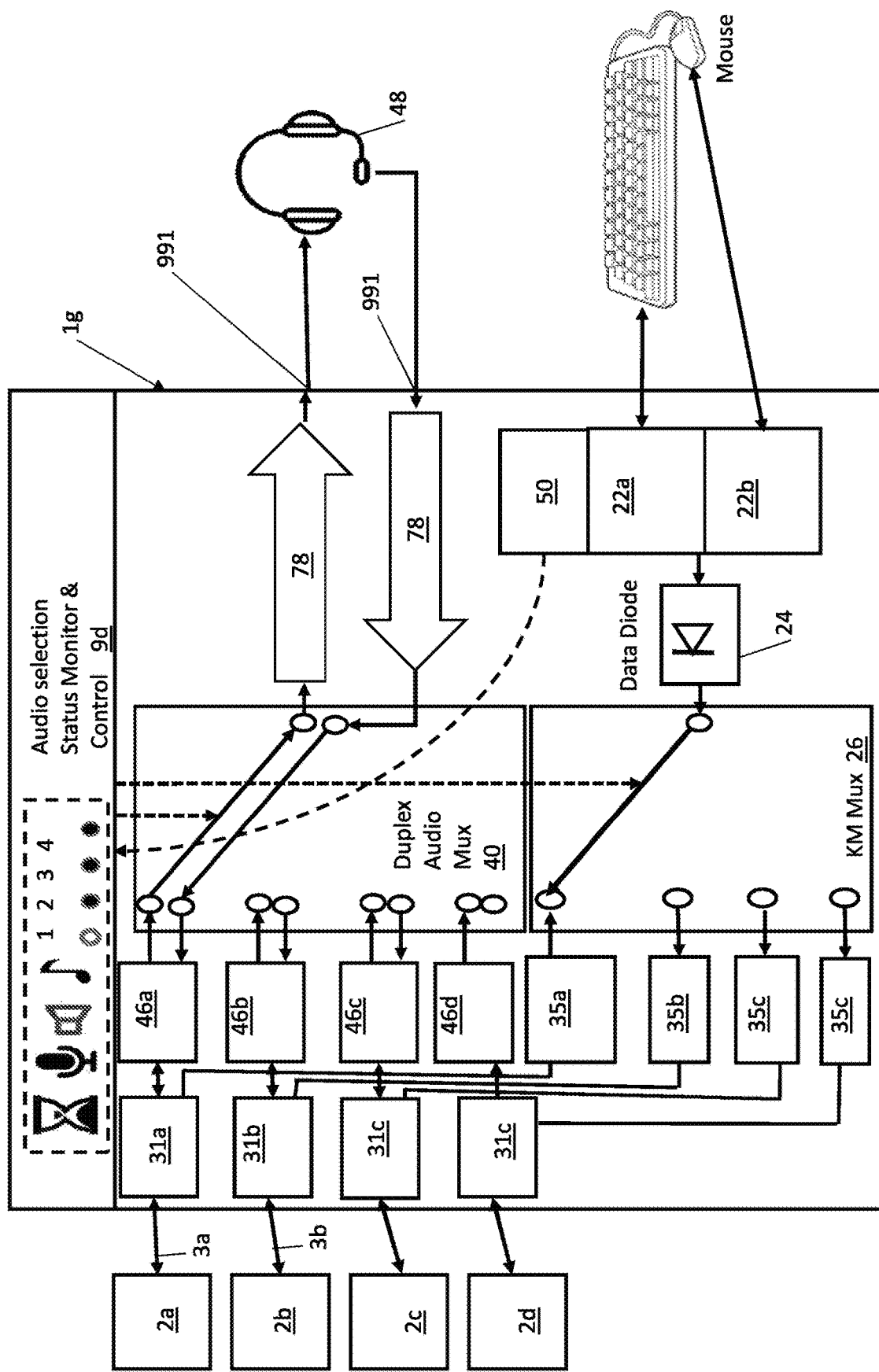
FIG. 8A schematically depicts a secure audio switch according to another exemplary embodiment.

FIG. 8A schematically depicts a secure audio switch according to another exemplary embodiment.

In this embodiment, which is similar to the embodiments depicted in FIGS. 6 and 7, the audio output channel 7 and Audio input channel 47 were replaced by unidirectional BRL 78. Similar replacement of audio output channel 7 can be replaced by unidirectional BRL 78 for the embodiments of FIGS. 3A to and 5.

Figure 8B:
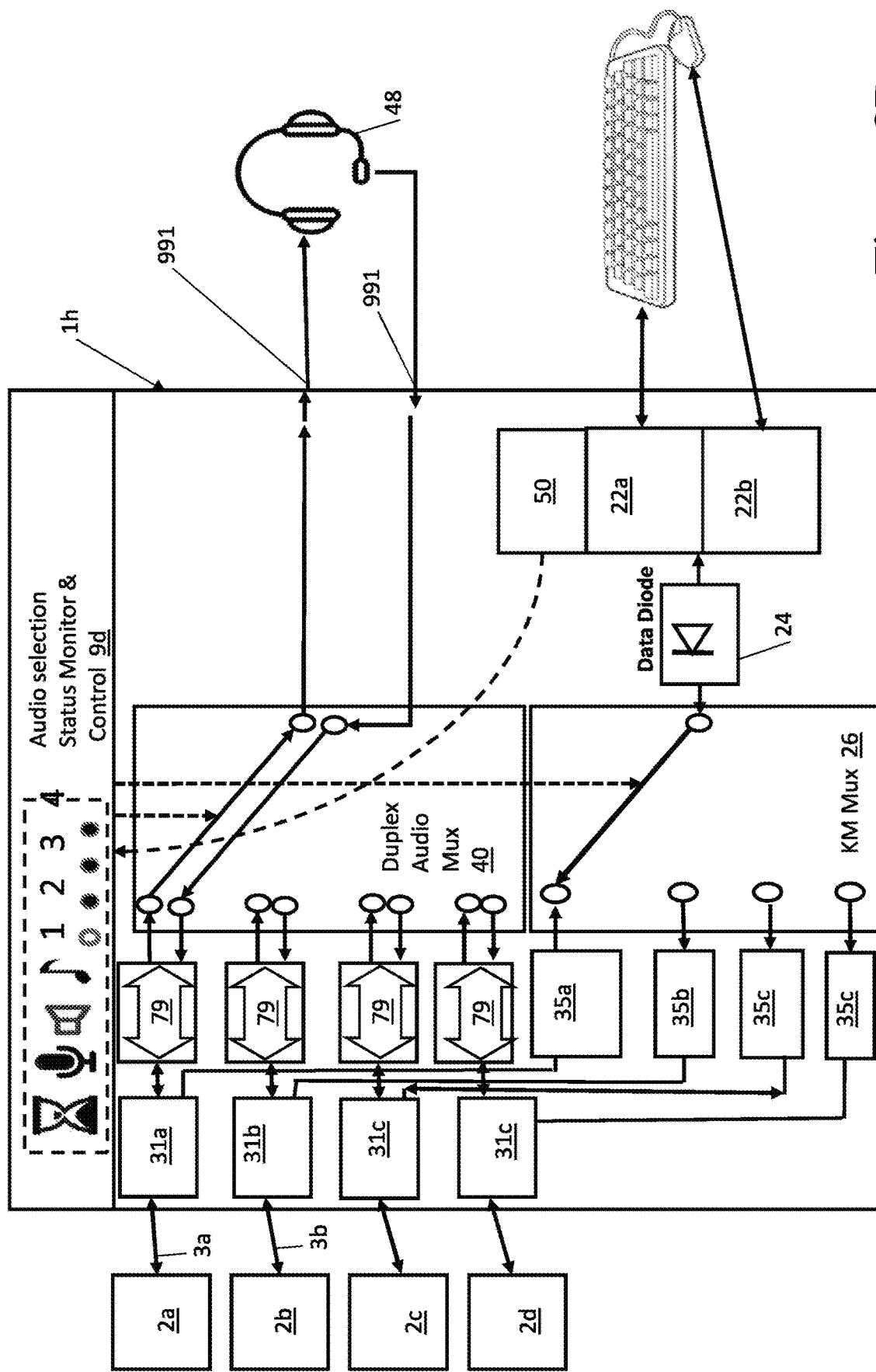
FIG. 8B schematically depicts a secure audio switch according to yet another exemplary embodiment.

FIG. 8B schematically depicts a secure audio switch according to yet another exemplary embodiment.

In this embodiment, the audio security measures are integrated into the CODECs 46x. Optionally, CODEC 46x may be replaced with a bidirectional security unit 79 (seen in FIG. 2B), wherein bidirectional security unit 79 comprises two unidirectional BRL 78, each for example having the construction of BRL 402 seen in FIG. 1G. Other optional configurations may be used.

Figure 9A:
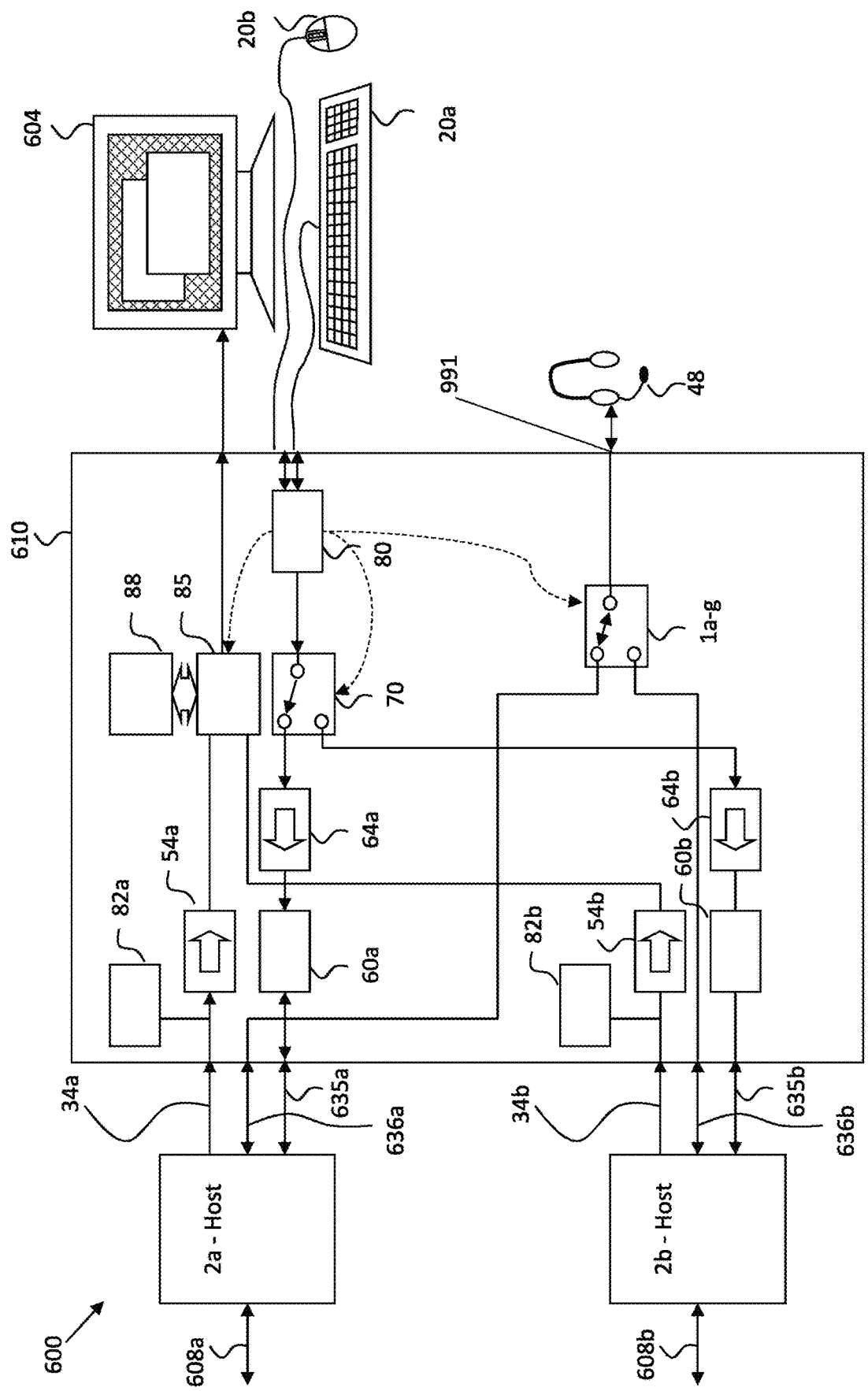
FIG. 9A schematically depicts a secure audio switch integrated within a Keyboard Video Mouse (KVM) switch or combiner 610 according to an exemplary embodiment.

FIG. 9A schematically depicts a secure audio switch integrated within a Keyboard Video Mouse (KVM) switch or combiner 610 according to an exemplary embodiment.

In this embodiment, the prior art KVM combiner of U.S. Pat. No. 8,769,172 was modified by replacing the audio switch with any of the secure audio switches 1a to 1g.

The figure illustrates a high-level block-diagram of an exemplary embodiment of a secure computer system 600 having Secured KVM Combiner 610 connected to a plurality of hosts 2x. Each host 2x may be connected to a different corresponding network 608x, each having different level of security.

Hosts 2x share, via Secured KVM Combiner 610 a screen 604, HID 20x and HS 48.

In this embodiment video processing function (video MUX) 85 receives multiple digital video data from hosts 2x via corresponding video channels 34x and optional physical isolators 54x to generate corresponding windows 84x on display 604.

To enable asynchronous video input and to enable additional video function an optional volatile memory 88 serving as video frame buffer connected to the video processing function 85. Volatile memory 88 may be DRAM, DDR or any suitable fast volatile memory type. Video processing function 85 may optionally be comprised of discrete logic, CPU, FPGA or ASIC technology. Video processing function 85 receives commands from host controller function 80 based on user mouse and keyboard input. The host controller function 80 calculates mouse location in system mode, keys status, windows sizes, priority and locations and all other machine states and send proper commands to the video processing function 85 directly or through optional unidirectional flow device. User specific settings and administrator settings are all stored in the host controller function 80 non-volatile memory. In these embodiments, host controller function 80 comprises the functionality of Monitor and control unit 9x and is seen (dashed arrows) controlling the various MUXs.

Video processing function 85 can receive video data from hosts that are not at the same display setting (resolution, refresh rate, colors, and phase) and stores it temporarily on the volatile memory frame-buffer 88. Video output is generated by reading the volatile memory frame-buffer 88 content at any needed rate. Output display resolution can be adapted to any desirable setting irrespective to video input settings. Video processor may have a non-volatile memory device 86 to store CPU, FPGA or ASIC program and optional customer specific graphics such as display background images. Video processing function 85 typically connected to the user display 604 through DVI or HDMI transmitter acting as a unidirectional flow device. Non-volatile memories 82x are connected to the Host Computers 2x respectively. Non-volatile memory may contain display parameters readable to the host to emulate standard display DDC (Display Data Channel). Upon connection of Secured KVM Combiner to the Host Computers 2x. Host computers video circuitry interrogates the non-volatile memory functions 82x to receive Plug & Play parameters such as display name, supported display resolution, supported display refresh rate etc. Non-volatile memory functions 82x may be programmed by the user to provide adequate information to the Host Computers as needed.

Host controller 80 connected to the peripheral switch 70 interfaces between the bidirectional data flow of the connected HID 20x and the physically forced unidirectional data flow to the peripheral emulators 60x. Since peripheral protocols are bi-directional in nature and the data path between the host controller 80 and the peripheral emulators 60x is forced to unidirectional flow, the host controller serves as an interface between the standard peripheral protocol (such as PS/2 or USB) and the non-standard unidirectional internal protocol. This internal protocol may use one way serial, I2C I2S or any other standard or non-standard interface. Video switch or video combiner 85 and peripheral switch 70 can be manually operated by the user by means of mechanical switch. Video switch or video combiner 85 and peripheral switch 70 can be alternatively controlled by host controller function 80 to switch sources based on preprogrammed keyboard keys combination or mouse control.

Audio switching is added to the Secured KVM Combiner device 610 in order to enable user to operate audio peripherals such as microphone, headset 48 by integrating into KVM 610 any of the audio switches 1*a* to 1*g* as explained in connection with FIGS. 3A to 8B.

In the depicted embodiment, video cables 34*x*, HID cables 635*x* and audio cables 636*x* are seen separated. However, as was seen in FIGS. 4 to 8B, HID and audio channels may be united to one cable 3*x*.

Figure 9B:
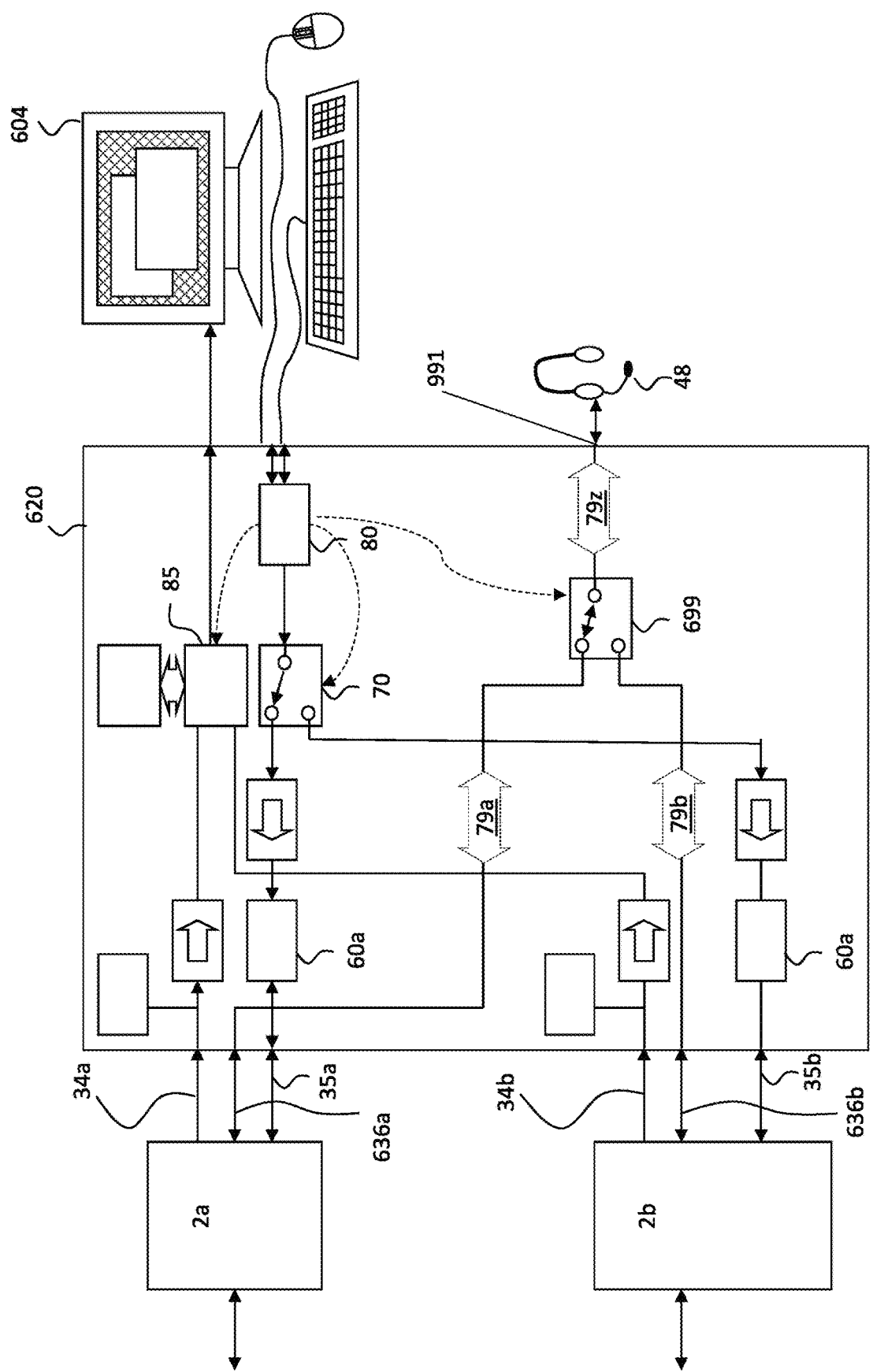
FIG. 9B schematically depicts a secure audio switch integrated within a Keyboard Video Mouse (KVM) switch or combiner 620 according to another exemplary embodiment.

FIG. 9B schematically depicts a secure audio switch integrated within a Keyboard Video Mouse (KVM) switch or combiner 620 according to another exemplary embodiment.

In the depicted embodiment, video cables 34*x*, HID cables 635*x* and audio cables 636*x* are seen separated. Optionally, host controller function 80 is capable to control at least one or more of video switch or processing function 85 KM switch 70 and audio switch 699 via control keystrokes or mouse pointing or clicks.

Host selection may be indicated on screen 604 for example using icons, warnings or changing colors of the active windows.

To secure the audio input and output channels, bidirectional security unit 79*a* and 79*b* are respectively placed between hosts 2*a* and 2*b* and the audio switch 699. Optionally, additionally or alternatively, bidirectional security unit 79*a* is placed between the audio switch 699 and HS 48.

FIG. 9B schematically depicts a secure audio switch integrated within a Keyboard Video Mouse (KVM) switch or combiner 620 according to another exemplary embodiment.

In the depicted embodiment, video cables 34*x*, HID cables 635*x* and audio cables 636*x* are seen separated. Optionally, host controller function 80 is capable to control at least one or more of video switch or processing function 85 KM switch 70 and audio switch 699 via control keystrokes or mouse pointing or clicks.

Host selection may be indicated on screen 604 for example using icons, warnings or changing colors of the active windows.

To secure the audio input and output channels, bidirectional security unit 79*a* and 79*b* are respectively placed between hosts 2*a* and 2*b* and the audio switch 699. Optionally, additionally or alternatively, bidirectional security unit 79*a* is placed between the audio switch 699 and HS 48.

Figure 9C:
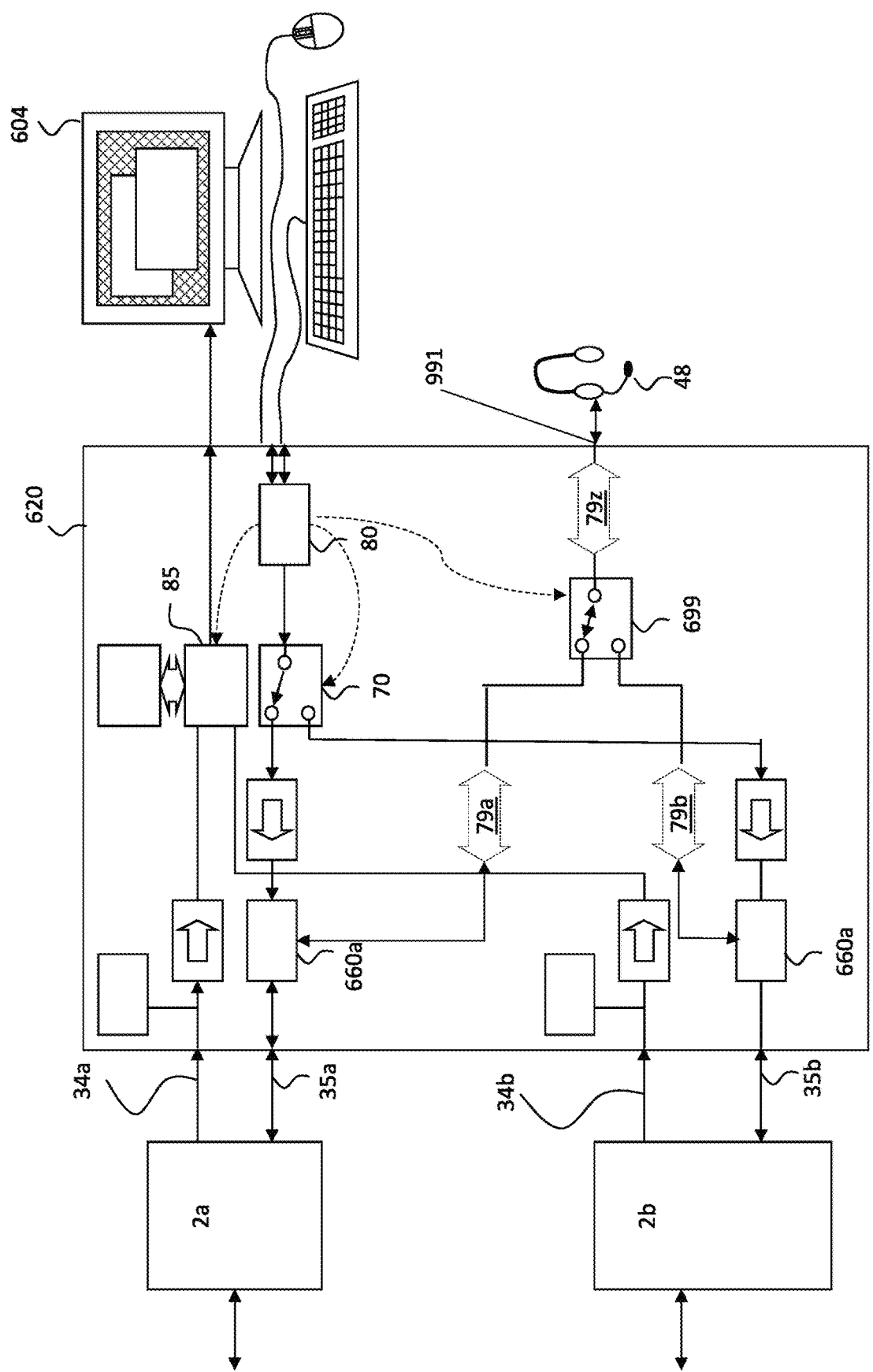
FIG. 9C schematically depicts a secure audio switch integrated within a Keyboard Video Mouse (KVM) switch or combiner according to another exemplary embodiment.

FIG. 9C schematically depicts a secure audio switch integrated within a Keyboard Video Mouse (KVM) switch or combiner 620 according to another exemplary embodiment.

In the depicted embodiment, video cables 34*x*, HID and audio data are exchanged via cables 636*x* each connected to a corresponding USB host interface 660*x*. In this embodiment, digital input audio data arriving from host 2*x* is recovered in USB host interface 660*x* and sent to the corresponding bidirectional security unit 79*x*. Digital output audio data arriving from audio switch 699 via he corresponding bidirectional security unit 79*x* is combined with HID unidirectional data arriving from KM switch 70 within USB host interface 660*x* which acts as a peripheral emulator.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

The invention claimed is:

1. A secure audio switch comprising:
a plurality of host computer interfaces, each for interfacing the secure audio switch with a corresponding host computer, for receiving audio signals from said corresponding host computer;
a user audio interface, for interfacing the secure audio switch with at least one user audio device, wherein said at least one user audio device comprises at least one of an analog speaker or an analog earphone;
an Audio Output Channel (AOC) comprising an analog low pass filter with a minimum bandwidth required for reproducing human speech, and an analog audio diode configured to transfer the audio signal to the user audio interface, wherein the analog low pass filter is configured to transfer the audio signal to the analog audio diode and the analog audio diode configured to be coupled to said user audio interface, whereby said AOC comprising said analog low pass filter and said analog audio diode is configured to prevent audio signals from returning from the user audio interface to the hosts, and to reduce a risk of malicious data transfer using the audio signals to the at least one user audio device through the audio switch;
a monitor and control unit, for receiving user's selection of a selected one of said plurality of host computer to be interfaced with said user audio interface, and indicating to the user which of said hosts is currently selected to be interfaced with said user audio interface; and
an audio MUX, receiving user selection of the host selected to be interfaced with said user audio interface from said monitor and control unit, and in response, coupling only said selected host computer interface to said audio AOC.

2. The secure audio switch of claim 1, further comprising:
a user audio input interface, for interfacing the secure audio switch with at least one user audio input device, wherein said at least one user audio input device comprises a microphone;
an Audio Input Channel (AIC), coupled to said user audio input interface and to said audio MUX, comprises audio security device to reduce data leak by intentionally reducing data rate capable of flowing through said AIC to a maximum rate comparable to the minimal rate required for reproducing human speech, and forcing audio data flow only in the direction from said user audio input interface, wherein said audio MUX, further coupling only said selected host computer interface to said AIC.

3. The secure audio switch of claim 2, wherein said AIC comprises:
  a low pass filter for intentionally reducing data rate capable of flowing through said AIC; and
  a data diode, forcing audio data flow only to said user audio interface and preventing any data from being transmitted from said user audio interface.

4. The secure audio switch of claim 3, wherein said low pass filter in said AIC is configured to pass only frequencies between 1 and 1000 Hz.

5. The secure audio switch of claim 4, wherein said low pass filter in said AIC is configured to pass only frequencies between 20 and 600 Hz.

6. The secure audio switch of claim 2, wherein said AIC comprises:
  an outgoing coding vocoder, for receiving outgoing audio signal from said user audio input interface, and compressing said outgoing audio signal to an outgoing low bit-rate digital data indicative of human speech included in said outgoing audio signal;
  an outgoing decoding vocoder coupled to said outgoing coding vocoder for receiving said outgoing low bit-rate digital data generated by said outgoing coding vocoder, and decompressing said low bit-rate digital data to a secure outgoing audio signal, wherein a maximum bit-rate of said outgoing low bit-rate digital data is intentionally limited to bit rate sufficient for transmitting compressed human speech, wherein said secure outgoing audio signal reproduces only said human speech included in said outgoing audio signal when the audio security device is operated in a secure mode.

7. The secure audio switch of claim 1, wherein said analog low pass filter configured to pass only frequencies between 1 and 1000 Hz.

8. The secure audio switch of claim 7, wherein said analog low pass filter configured to pass only frequencies between 20 and 600 Hz.

9. The secure audio switch of claim 1, wherein:
  said monitor and control unit further capable of receiving user's selection of a selected one of said plurality of host computer to be interfaced with at least one Human Interface Device (HID), and indicating to the user which of said hosts is currently selected to be interfaced with said HID, and
  the secure audio switch further comprising:
    at least one Host Emulator (HE) for connecting said HID, wherein said HID comprises at least one of keyboard or a mouse,
    wherein said HE is for exchanging bidirectional data with said HID, and generating single unidirectional serial output signals representing commands from said HID;
    a data diode, forcing flow of said single unidirectional serial output signals only in the direction from said HE; and
    a KM MUX, controlled by said monitor and control unit, coupling only one currently selected host computer interface to said data diode,
    wherein said plurality of host computer interfaces further capable of converting said single unidirectional serial output signals received from said KM MUX to bidirectional HID commands to be exchanged with the corresponding host computer.

10. The secure audio switch of claim 9, further comprising:
  a plurality of host computer video interfaces, each for interfacing the secure audio switch with a corresponding host computer, for receiving video signals from said corresponding host computer;
  a plurality of video diodes, each coupled to a corresponding host computer video interface, forcing the flow of said video signals only in the direction from said host computer video interfaces;
  a user video interface, for interfacing the secure audio switch with at least one user display;
  a video MUX, controlled by said monitor and control unit, for receiving video signals from said video diodes, said video MUX is capable of at least one of:
coupling only selected one of said host computer video interfaces with said user video interface, or
  combining video signals from at least two host computer video interfaces and send the combined video signal to said at least one user display.

11. The secure audio switch of claim 10, wherein:
user's selection of an active host is causing said active host to be selected as: the selected one of said plurality of host computer to be interfaced with said HID, the selected one of said plurality of host computer to be interfaced with said user audio interface, and the selected one of said user video interfaces to be coupled with said user video interface.

12. The secure audio switch of claim 10, wherein:
user's selection of an active host is causing said active host to be selected as: the selected one of said plurality of host computer to be interfaced with said HID, and the selected one of said user video interfaces to be coupled with said user video interface, but the selected one of said plurality of host computer to be interfaced with said user audio interface is different than said active host.

13. The secure audio switch of claim 10, wherein:
user's selection of an active host is causing said active host to be selected as: the selected one of said plurality of host computer to be interfaced with said HID, and the selected one of said user video interfaces to be coupled with said user video interface, but the selected one of said plurality of host computer to be interfaced with said user audio interface is the same as said active host.

14. The secure audio switch of claim 9, wherein user's selection of an active host is causing said active host to be selected as both the selected one of said plurality of host computer to be interfaced with said HID, and the selected one of said plurality of host computer to be interfaced with said user audio interface.

15. The secure audio switch of claim 9, wherein user's selection of a selected one of said plurality of host computer to be interfaced with said HID is different than user's selection of the selected one of said plurality of host computer to be interfaced with said user audio interface.

16. The secure audio switch of claim 9, wherein said HE is a USB host emulator.

17. The secure audio switch of claim 9, wherein user's selection of a selected one of said plurality of host computer to be interfaced with said HID is the same as user's selection of the selected one of said plurality of host computer to be interfaced with said user audio interface.

18. The secure audio switch of claim 1, wherein each of said plurality of host computer interfaces is capable of at least:
exchanging bidirectional digital data with the corresponding host computer, separating audio input data from said bidirectional data, and transferring said audio input data to said audio MUX.

19. The secure audio switch of claim 18, wherein each of said plurality of host computer interfaces is further capable of converting said audio input data from digital format to analog signal transferred to said audio MUX.

20. The secure audio switch of claim 19, wherein each of said plurality of host computer interfaces is further capable of receiving analog output signal from said audio MUX, converting said analog audio output signal to digital audio output data, and transfer said digital audio output data to a corresponding computer.

21. The secure audio switch of claim 1, wherein:
said AOC further comprising a music bypass switch, wherein said music bypass switch temporarily allows said AOC to transfer data above said maximum rate comparable to the minimal rate required for reproducing human speech, to a music maximum rate required to allow reproducing music sound quality, higher than voice sound quality while said music bypass switch is activated.

22. The secure audio switch of claim 1, wherein said host computer interfaces are USB interfaces.

* * * * *